(12) United States Patent
Kapoor

(10) Patent No.: US 9,978,045 B2
(45) Date of Patent: May 22, 2018

(54) FUNDING TRANSACTIONS IN A MODULAR LEARNING SYSTEM

(75) Inventor: Samridh Kapoor, Mumbai (IN)

(73) Assignees: MONK AKARSHALA DESIGN PRIVATE LIMITED, Mumbai (IN); MONK AKARSHALA INC., Sacramento, CA (US)

( * ) Notice: Subject to any disclaimer, the term of this patent is extended or adjusted under 35 U.S.C. 154(b) by 371 days.

(21) Appl. No.: 14/344,518

(22) PCT Filed: Sep. 12, 2012

(86) PCT No.: PCT/US2012/054695
§ 371 (c)(1),
(2), (4) Date: Mar. 12, 2014

(87) PCT Pub. No.: WO2013/039932
PCT Pub. Date: Mar. 21, 2013

(65) Prior Publication Data
US 2014/0344145 A1 Nov. 20, 2014

(30) Foreign Application Priority Data
Sep. 13, 2011 (IN) .......................... 2598/MUM/2011

(51) Int. Cl.
*G06Q 40/00* (2012.01)
*G06Q 20/10* (2012.01)
(Continued)

(52) U.S. Cl.
CPC ............. *G06Q 20/10* (2013.01); *G06Q 10/10* (2013.01); *G06Q 20/383* (2013.01); *G06Q 40/00* (2013.01);
(Continued)

(58) Field of Classification Search
CPC .............................. G06Q 40/00; G06Q 40/02
(Continued)

(56) References Cited

U.S. PATENT DOCUMENTS 7,395,234 B2    7/2008   Kwan
7,831,509 B2    11/2010  Ireland et al.
(Continued)

FOREIGN PATENT DOCUMENTS

WO    WO0150440 A2    7/2001

OTHER PUBLICATIONS

I. Elaine Allen and Jeff Seaman, Learning on Demand, Jan. 2010, Babson College, web, 1-16 (Year: 2010).*

*Primary Examiner* — I Jung Liu
(74) *Attorney, Agent, or Firm* — Innovation Capital Law Group, LLP; Vic Lin

(57) ABSTRACT

A modular learning system is provided for enabling funding of learners in the modular learning system. The modular learning system provides learning services to users by enabling learning users to access learning applications and select tutors and learning facilities to enable the user to perform the learning applications. A funding user provides funds to the modular learning system and provides parameters for selecting learning users for funding. The modular learning system identifies learning users who match the parameters and enable the learning users to receive funding for eligible learning applications. The modular learning system disperses funding after determining particular learning performance requests are eligible items for funding.

15 Claims, 7 Drawing Sheets

(51) Int. Cl.
*G06Q 40/02* (2012.01)
*G06Q 40/06* (2012.01)
*G06Q 10/10* (2012.01)
*G06Q 50/20* (2012.01)
*G06Q 20/38* (2012.01)

(52) U.S. Cl.
CPC .............. *G06Q 40/02* (2013.01); *G06Q 40/06* (2013.01); *G06Q 50/20* (2013.01)

(58) Field of Classification Search
USPC .......................................................... 705/35
See application file for complete search history.

(56) References Cited

U.S. PATENT DOCUMENTS

| | | | |
|---|---|---|---|
| 2001/0031456 A1* | 10/2001 | Cynaumon | G09B 7/02 434/350 |
| 2002/0042767 A1* | 4/2002 | Kwan | G06Q 40/02 705/36 R |
| 2003/0055782 A1* | 3/2003 | Slater | G06Q 20/04 705/39 |
| 2003/0093346 A1 | 5/2003 | Weber | |
| 2003/0113697 A1* | 6/2003 | Plescia | G06Q 10/06 434/322 |
| 2004/0167822 A1* | 8/2004 | Chasen | G06Q 20/02 705/26.81 |
| 2005/0097017 A1* | 5/2005 | Hanratty | G06Q 40/00 705/35 |
| 2008/0241810 A1* | 10/2008 | Flores | G09B 5/00 434/350 |
| 2010/0285871 A1* | 11/2010 | Shah | G06F 21/552 463/29 |
| 2011/0173225 A1 | 7/2011 | Stahl et al. | |

\* cited by examiner

| | |
|---|---|
| Certification Metadata 302 | Scoring Metrics Metadata 304 |
| Language Metadata 306 | Performance Type Metadata 308 |
| Duration Metadata 310 | Subject Link/Tag Metadata 312 |
| Age Level Metadata 314 | Learning Facility Metadata 316 |
| Authoring Metadata 318 | Sequence Metadata 320 |
| Tool Metadata 322 | Mode Metadata 324 |
| Media Metadata 326 | Medium Metadata 328 |
| Job Skill Metadata 330 | Error Metadata 332 |
| Template Metadata 334 | Tutor Metadata 336 |

Learning Application 300

*FIG. 3A*

FUNDING TRANSACTIONS IN A MODULAR LEARNING SYSTEM

CROSS REFERENCE TO RELATED APPLICATIONS

This application is a U.S. National Stage of International Application No. 2012/US2012/054695, titled "Funding Transactions in a Modular Learning System" filed on 12 Sep. 2012 which claims the benefit of Indian Provisional Specification No. 2598/MUM/2011, titled "Modular Funding Transactions in a Modular Learning System" filed on 13 Sep. 2011, both of which are incorporated by reference in their entireties.

FIELD OF THE ART

The present invention relates generally to modular learning systems and more particularly to systems and methods of managing modular funding transactions in a modular learning system.

DESCRIPTION OF THE RELATED ART

The current education environment includes members like students or learners, teachers, tutors, coaches, guides, professors or lecturers, content authors, and organizational members like preschools, schools, colleges, universities, educational boards and professional standards authorities, admission testing authorities, placement organizations, recruiters, HR departments of organizations, educational content and media publishers and local, regional, and national governments. All the above maintain some form of transactional and functional relationships with each other. Conventionally, learners in the current education environment are funded for their learning, education, training or tuition expenses by their parents, school, college, university, a grant or an educational loan. Such funding amounts are usually very large, specific to the level of a tuition or admission fee for a particular program, degree or course, and are hence received after lengthy deliberation and analysis, especially by an institution like a university, granting authority or bank.

Learning systems, especially those offering the purchase and performance of discrete microlearning experiences may find it difficult to manage funding activities for education related products and services purchased by students in the traditional education environment, since they do not manage purchases of education related products and services conducted by students in the traditional education environment. Further, some learning systems, especially those offering the purchase and performance of discrete microlearning experiences may wish to enable learning users on the learning system to receive funding for microlearning expenses conducted on their modular learning system.

SUMMARY

The present invention provides a method and system for manning funding transactions in a modular learning system.

In an aspect, the invention provides a method for managing funding transactions in a modular learning system. Said method involves receiving a funding request from a funding user, displaying a funding preferences interface to the funding user, receiving the funding preferences from the funding user, determining the preferred subset of learning users to be funded, receiving the fund expiry and transaction limit preferences for each of the learning users from the funding user, processing the funding transaction, updating the balances of the learning users and the funding user; and, further, receiving a microlearning purchase request from any of the learning users, determining the compatibility to the funding preferences, processing the transaction from the fund balance in some embodiments, processing the transaction from account balance of the learning user in other embodiments, and displaying the corresponding updated balances to the learning user and the funding user.

In further aspect, the invention provides a system for managing funding transactions in a modular learning system. Said system comprises a funding items module, a language preferences module, a location preferences module, a learning user recommendation generator, a subject preferences module, a learning application preferences module, a transaction processor, a transaction limit manager, a fund expiry manager and a funding interface generator.

In final aspect the invention provides a non-transitory computer-readable medium having tangibly embodied thereon a program of instructions executable by a processor for managing funding transactions in a modular learning system. Whereby, said method comprises of receiving a funding request from a funding user, displaying a funding preferences interface to the funding user, receiving the funding preferences from the funding user, determining the preferred subset of learning users to be funded, receiving the fund expiry and transaction limit preferences for each of the learning users from the funding user, processing the funding transaction, updating the balances of the learning users and the funding user; and, further, receiving a microlearning purchase request from any of the learning users, determining the compatibility to the funding preferences, processing the transaction from the fund balance in some embodiments, processing the transaction from account balance of the learning user in other embodiments, and displaying the corresponding updated balances to the learning user and the funding user.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a modular learning environment including a modular learning system 144 according to one embodiment.

FIG. 3A is a block diagram of a learning application according to one embodiment.

DETAILED DESCRIPTION

Figure 1:
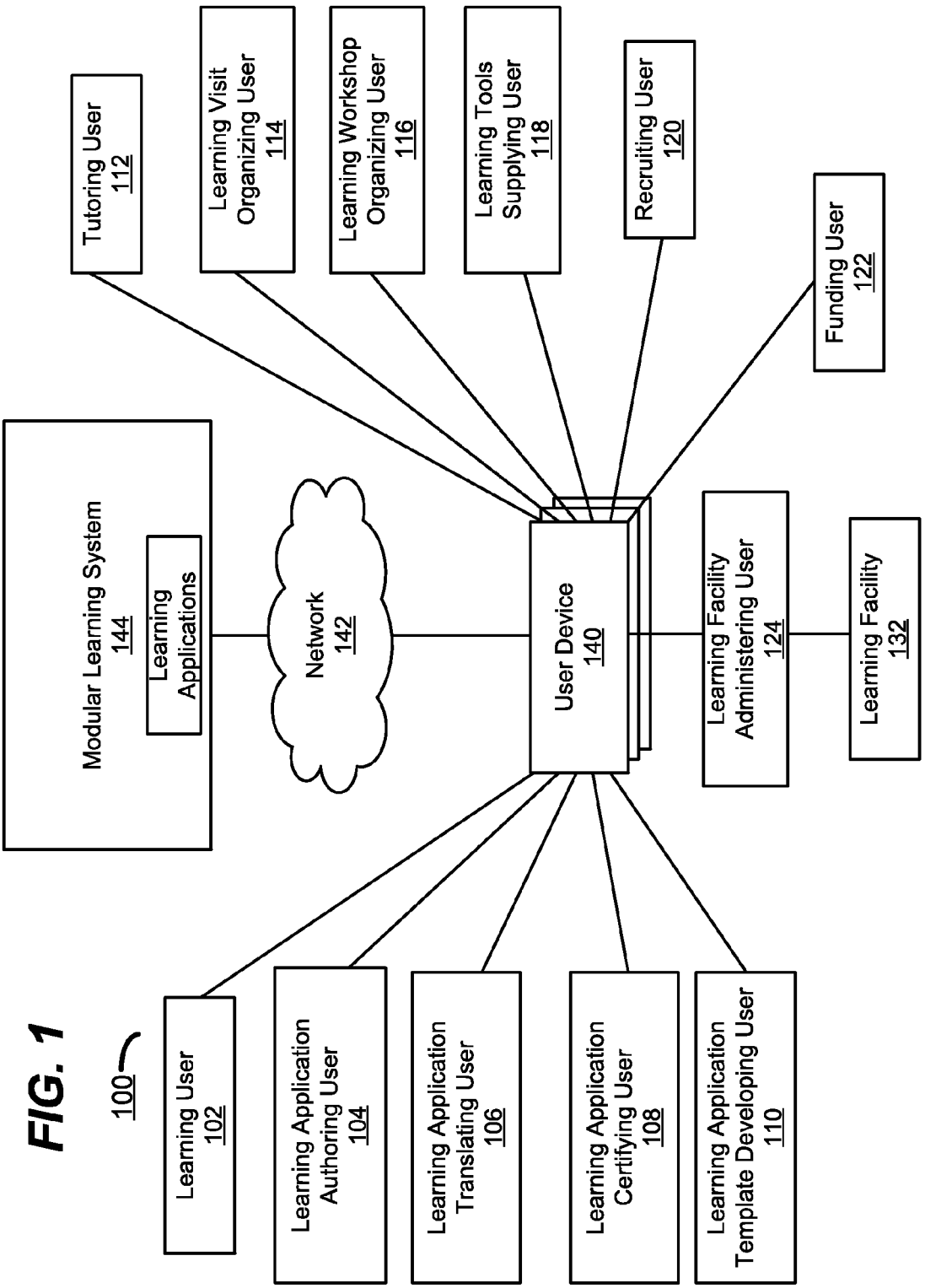

The Figures (FIGS.) and the following description relate to embodiments by way of illustration only. It should be noted that from the following discussion, alternative embodiments of the systems, methods, figures, diagrams and interfaces disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the systems, methods, figures, diagrams and interfaces illustrated herein may be employed without departing from the principles described herein. In the following description, for the purposes of explanation, numerous specific details are set forth in order to provide a thorough understanding of the various embodiments. It will be evident, however to one skilled in the art that the various embodiments may be practiced without these specific details.

Configuration Overview

A system and method of funding learners in a modular learning system is provided. A learning user in the learning system may want to obtain tutoring services from a particular tutoring user, learning content applications from another content application authoring user, learning tools, aids or materials from another learning tools or materials supplying user, learning visits from another learning visits organizing user, and may wish to seek placement or recruitment from another organization, registered on the system as a recruiting user. A funding user on the modular learning system may be a parent, not-for-profit grant authority, school, college, university, local, regional or national government, or even a bank or other financial institution providing educational financing. A funding management module in the modular learning system 144 may comprise a plurality of modules and generators like a funding items module, a language preferences module, a location preferences module, a learning user recommendation generator, a subject preferences module, a learning application preferences module, a transaction processor, a transaction limit manager, a fund expiry manager and a funding interface generator. A method for managing funding transactions in a modular learning system environment may comprise a plurality of steps like receiving a funding request from a funding user, displaying a funding preferences interface to the funding user, receiving the funding preferences from the funding user, determining the preferred subset of learning users to be funded, receiving the fund expiry and transaction limit preferences for each of the learning users from the funding user, processing the funding transaction, updating the balances of the learning users and the funding user; and, further, receiving a microlearning purchase request from any of the learning users, determining the compatibility to the funding preferences, processing the transaction from the fund balance in some embodiments, processing the transaction from account balance of the learning user in other embodiments, and displaying the corresponding updated balances to the learning user and the funding user.

FIG. 1 is a modular learning environment 100 including a modular learning system 144 according to one embodiment. Modular learning system 144 operates in modular learning environment 100 and communicates with a plurality of user devices 140 over a network 142. The user devices 140 are operated by a plurality of kinds of users in the learning environment. The user devices 140 may comprise any of a variety of computing devices, such as a desktop computer, a laptop, a mobile device, a tablet computer, a set-top box, a kiosk, interactive television, gaming console, and other computing platforms suitable for communicating with modular learning system 144. The modular learning system 144 provides a system for managing curricula, learning facilities, standardized tests, learning applications, tutors, and other modules of a learning experience in micro increments of time and money. The modular learning system 144 enables the various users to communicate with other users in a learning environment and provide services to learning user 102. The network 142 includes a wireless area network, a local area network, a General Packet Radio Service (GPRS) network, an Enhanced Data for Global Evolution (EDGE) network and the like. The user devices 140 are connected to the modular learning system 144 via the network 142.

Modular learning system 144 allows a learning user 102 to manage the purchase and performance of each module of a single microlearning service stack for a learning application (e.g., Breaststroke) or a group of learning applications (e.g., Breaststroke, Freestyle, Butterfly and Swimming Safety). Tutor access, such as access to a swimming instructor may be purchased in various increments, such as in hours. Learning content applications such as a breaststroke application with attached instructional media and other data may be purchased in timed access quantities or may be permanently purchased. Learning facility access such as an Olympic Sized Swimming Pool may be purchased in increments of hours or learning application performances such as ten laps. Learning tools or materials such as Swimming Goggles may be purchased as well. Each of these modules may be separately purchased and interacted with through an interface displayed on user device 140. In case of a learning performance which can be completed on the user device 140 itself, the learning application content is not only purchased and managed, but also performed, through an interface displayed on the user device 140. A learning user 102 may manage the purchase and performance of groups of microlearning performances in the form of learning visits and learning workshops, through an interface displayed on user device 140. Learning user 102 may manage an individual learning identity (or learning profile) and offer details of microlearning application performances completed by the learning user, as well as the personal learning metrics, scores, and reviews. This learning identity may be provided to recruiting users for the purpose of placement.

The modular learning system 144 manages, regulates and supervises the purchase, sale, preview, performance and review of a plurality of microlearning applications, each comprised modularly of a tutoring service, a learning application, learning facility access, and/or learning tools or infrastructure access, a learning visit, and/or a workshop as described in further detail below. The modular learning system 144 manages transactional and functional relationships between users of the modular learning system 144. These various users interact with the modular learning system 144 to modify learning applications and provide learning service as described below.

The modular learning system 144 may enable various other users including but not limited to tutors, authors, tool/material suppliers learning application template developers, translators, certifying user, learning facility administrators, learning event organizers, recruiters, and funders to modularly manage at least one of micro tutoring services associated with specific learning applications, microlearning content applications, microlearning application templates, translation of microlearning content applications, certification of microlearning content applications, access to learning facilities, access to learning workshops, organization of learning visits associated with specific learning applications, supply of tools, aids and/or materials, recruitment services, as well as granular funding services.

The modular learning system 144 enables a tutoring user 112 to provide micro tutoring services to learning user 102. Tutoring user 112 are typically individuals with credentials or other knowledge in the area of learning applications. The tutoring user 112 may associate themselves with particular pieces of content to and may indicate qualifications to teach each learning application, as is described further below. The modular learning system 144 manages the sale of micro tutoring services and associated tutoring user 112 with specific learning applications to learning user 102. Tutoring user 112 assist the learning user 102 with learning the subject matter of the learning application. The tutoring user may provide tutoring to the learning user 102 by meeting the learning user 102 in person to assist the learning user 102 in performing the learning application. As such, the modular learning system 144 facilitates the meeting and communication of tutors and learners. Tutoring user 112 may also provide learning performance data to the modular learning system 144. The learning performance data may indicate, for example, the level of the learner's mastery or proficiency through scoring or other metrics for reviewing performance at a learning performance task. The tutoring user 112 provides input to the modular learning system 144 using a plurality of learning applications through an interface displayed on the tutoring user's 112 user device 140.

The modular learning system 144 enables a learning application authoring user 104 to manage the drafting, editing, testing, publishing, sale and updates of learning content in applications through an interface displayed on user device 140. That is, the learning application authoring user 104 authors individual pieces of learning content which may be purchased and used by a learning user. For example, a learning application authoring user 104 may create instructional content for learning the backstroke. The instructional content may comprise instructions and multimedia, as well as directions for the learning user 102 to practice aspects of the backstroke in a suitable pool. The learning application authoring user 104 may use a pre-existing application template to create the learning application.

The modular learning system 144 enables a learning application template developing user 110 to create learning templates for use in creating learning applications. The learning application templates provide a framework for creating various types of learning applications. For example, learning application templates may comprise a quiz, simulation, role play, experiment, multimedia material, and other types of learning frameworks. The learning application template developing user 110 may manage the development, testing and sale of the learning application templates to learning application authoring users 104 through an interface displayed on a user device 140.

The modular learning system 144 enables a learning application translating user 106 to manage the translation and translation updates of learning content in applications and sale of such services to microlearning content application authors through an interface displayed on a user device 140. The translations are provided to the modular learning system 144 and may be stored with the corresponding learning application to enable providing instructions to learning users 102 in a variety of languages.

The modular learning system 144 enables a learning application certifying user 108 to certify various learning applications according to standards applied by the certifying user 108. Such certifying users may include boards of education at various levels, universities, professional standards groups, and other certification authorities. Certifying users 108 may or may not be formal institutions. For example, a certifying user may include a company establishing a set of learning applications to prepare a candidate for a job with the company. The certifying user 108 manages the certification of each learning content application as a part of their respective curricula or syllabi and manages the sale of such certification services to learning content application authoring users, through an interface displayed on user device 140.

The learning facility 132 facilitates the performance of specific learning applications available on the modular learning system 144. Learning facilities 132 may comprise any location suitable for performing types of learning applications. For example, learning facilities 132 may comprise an athletic club, a chemistry lab, a science lab, a university, a library, or a tutor's home. In some embodiments, the modular learning system 144 enables a facility administering user 124 to determine the compatibility of various learning applications which can be performed within learning facility 132 by picking the learning infrastructure available in the learning facility and associating the learning facility 132 with each learning application (e.g., Breaststroke) compatible with the learning infrastructure (e.g., Olympic sized Swimming Pool). In one embodiment, rather than expressly associating the learning facility with individual learning applications, the learning facility administering user 124 indicates to the modular learning system 144 the specific infrastructures and amenities available at the learning facility 132. In this embodiment, the modular learning system 144 enables a learning user 102 or learning application authoring user 104 to identify a learning facility 132 which is compatible with the learning application based on the infrastructure available at the learning facility 132. The modular learning system 144 may also identify compatible learning facilities based on metadata associated with the learning application and the infrastructure indicated by the learning facility administering user 124.

The learning facilities 132 may comprise a variety of types of learning facilities, such as an independent learning facility, institutional learning facility, workplace learning facility, and temporary learning facility. The modular learning system 144 enables an administrator 124 of an independent learning facility owned, managed or franchised by the modular learning system 144 to manage the sale of learning facility access for performances of specific microlearning applications as well as sale of learning tools and materials (e.g., sulphuric acid or swimming goggles) or access to the same in micro increments of time and money ($six/hour or $five/learning application performance) depending on multiple factors like the learning infrastructure to be accessed (e.g., Swimming Pool, Computers, Chemistry Lab), number of hours of access, and the like, through an interface displayed on a user device 140.

The modular learning system 144 enables an administrator 124 of an institutional learning facility like a preschool, school, college or university (e.g., Bangalore University) associated, partnered or linked with the modular learning system 144 to, in addition to managing the sale associated with the independent learning facility (e.g., learning facility access for performances of specific microlearning applications), manage the learning performances of a plurality of learners (students or outsiders) across a plurality of learning applications available on the system (with the learning user's explicit consent), optionally delegated to a plurality of teachers, professors, lecturers or coaches registered as tutoring users 112 on the modular learning system 144, through an interface displayed on a user device 140.

The modular learning system 144 enables an administrator 124 of a workspace learning facility associated, partnered or linked with the modular learning system 144 to, in addition to managing the sale associated with the independent learning facility (e.g., learning facility access for performances of specific microlearning applications), manage the learning performances of a plurality of learners (employees) across a plurality of learning applications available on the system (with the learning user's explicit consent), optionally delegated to a plurality of Human Resource Managers, Trainers and/or immediate superiors, registered as tutoring users 112 on the modular learning system, through an interface displayed on a user device 140.

The modular learning system 144 enables an administrator 124 of a temporary learning facility (e.g., a Cricket Ground available for net practice on Saturdays and Sundays from six in the morning to twelve at midnight) to, in addition to managing the sale associated with the independent learning facility (e.g., learning facility access for performances of specific microlearning applications), manage the hours of accessibility to the designated learning facility, through an interface displayed on a user device 140. In addition to managing the sale and performance of microlearning applications, an administrator of an independent, institutional, workspace, or temporary learning facility may manage the modular purchase of learning infrastructure (e.g., chemistry equipment, computers, cricket stumps) as well as learning tools, aids and materials (e.g., sulphuric acid, swimming goggles, cricket bat) from the modular learning system or a third party, topic wise, subject wise, location wise or otherwise based on the learning applications intended to be offered in the designated learning facility, through an interface displayed on a user device 140.

The modular learning system 144 enables a learning visit organizing user 114 to manage the organization of learning visits, and the sale of learning visits to learning users 102. The learning visit organizing user 114 may also associate a learning visit with compatible microlearning applications. Such learning visits may comprise, for example, a visit to a factory or industrial area, a museum, or a trip to a city. The learning visit organizing user 114 may associate the learning visit with learning applications and manage the learning performances during the learning visits. The management of performances of associated learning applications may be optionally provided by tutoring users 112. The learning visit organizing user 114 communicates with the modular learning system 144 through an interface displayed on a user device 140.

The modular learning system 144 enables a learning workshop organizing user 116 to manage the organization of workshops available to learning users 102. A workshop comprises a plurality of specific microlearning applications to be performed in the workshop, and a sequence of the microlearning applications to be performed at the workshop. The workshop may also specify learning tools, a designated learning facility, and a tutoring user or tutoring users to perform the workshop. As such, the workshop user organizes performance and modules of learning applications to be performed together with a group of learning users 102. The learning workshop organizing users 116 also manage the sale of such microlearning workshop access and manage the learning performances for a plurality of learners. The learning workshop organizing users communicate with the modular learning system 144 through an interface displayed on a user device 140.

The modular learning system 144 enables a learning tools supplying user 118 to provide learning tools and materials such as chemicals, biology samples, computer software, and other materials for use with learning applications to learning users 102. The learning tools supplying user 118 manages the organization and sale of the learning tools and materials (or optionally, access to the same) to learning users and administrators of learning facilities 132. The learning tools supplying user 118 may also associate learning tools with particular learning applications stored on modular learning system 144. Alternatively, the learning tools supplying user 118 may designate the tools available and the modular learning system 144 may determine which learning applications may require the tools provided by the learning tools supplying user 118. The learning tools supplying user communicates with the modular learning system 144 through an interface displayed on a user device 140.

The modular learning system 144 enables a recruiter 120 of learning users 102 to manage the recruitment of learning users 102 through the modular learning system 144. The recruiter 120 may view and filter learning users 102 by specific learning applications performed on the system, scores, metrics and reviews generated in relation to the learning applications performed by learning users 102. The recruiter may access and filter learning users 102 based on demographic data like the language used in performing the learning application. Recruiting user 120 may also operate as a certifying user 108 to certify particular learning applications that may be desirable to the recruiting user 120. The recruiting user may use the certified application as a filter prior considering learning users for a position. The recruiting user 120 manages recruiting access to the modular learning system 144 through an interface displayed on a user device 140.

The modular learning system 144 enables a funding user 122 of learning users 102 to provide funding and scholarship funds and other support to learning users 102. Such funding users 122 may comprise a parent, sibling, friend, spouse, relative, university, employer, or scholarship/grant offering institution. The funds may be provided for the funding of specific learning users or of specific learning applications, or of specific microlearning goods and services associated with the specific learning applications, in small increments, through an interface displayed on a user device 140.

Although the modular learning environment 100 is described as being composed of various, user devices (e.g., personal computer), a network (e.g., internet, intranet, world wide web), learning facilities (e.g., an Independent Learning Facility, an Institutional Learning Facility), it would be appreciated by one skilled in the art that fewer or more kinds of users (e.g., a Learning Application Fact Checking User, a Web Based Offsite Tutoring User), user devices (e.g., a mobile phone device, a portable gaming console device, a tablet device, a learning console device, gaming console device or server device attached to a television or other screen), networks (e.g., an intranet at a preschool, school, college, university, educational board, professional standards authority, coaching/tuition class; a social or professional network; an intranet at a company, HR department, training department and at a training organization) and learning facilities may comprise the modular learning environment 100, with the present disclosure still falling within the scope of various embodiments.

Figure 2:
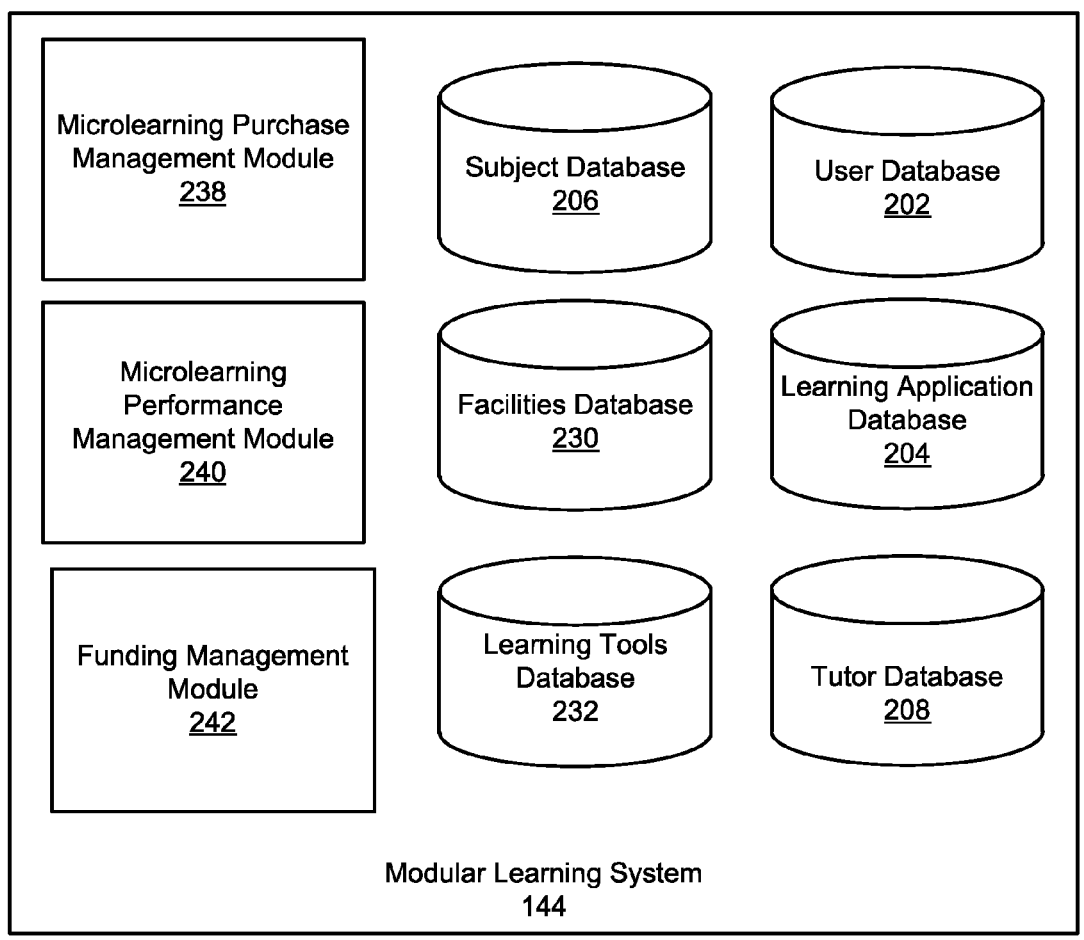
FIG. 2 is a block diagram of a modular learning system according to one embodiment.

FIG. 2 is a block diagram of a modular learning system 144 according to one embodiment. The modular learning system 144 includes a variety of databases and modules for providing learning applications and learning services to users of the modular learning system 144. The modular learning system 144 maintains learning applications in a learning application database 204. The learning applications are sold to users along with microlearning services using the purchase management module 238. Performance of learning applications is enabled by performance management module 240. Additional modules of the modular learning system 144 are described below.

A user database 202 is configured for receiving, storing, updating and retrieving a plurality of data fields of each user, such as the user's name, address, and contact details. Depending on the user's role in the modular learning system 144, the user database 202 maintains additional information on the user. For example, for a learning user 102, the user database 202 maintains learning history outside the modular learning system 144, learning application performance history on the modular learning system 144, purchase history of learning applications as well as purchase history of a host of related microlearning purchase items like, for example, timed access to learning facility 132, timed access to tutor 112, and purchase of access to a learning tool from learning tools database 232. In some embodiments, the data fields are used to determine purchase compatibility using purchase management module 238 and to determine performance compatibility using performance management module 240.

The user database 202 may maintain information about each type of user based on the user's role in the system. The user information may be stored in a plurality of databases, each database associated with a user role, or the user roles may be stored in a single user database 202. For example, the additional user roles include learning application authoring users, learning facility administering users, learning visit organizing users, learning facility administering users, and other types of users of the modular learning system 144.

In one embodiment, a distinct Learning User Database is configured for receiving, storing, updating and retrieving a plurality of identity items of each learning user 102, comprising the learning user's name, address, contact details as well as learning related identity items like learning history outside the modular learning system 144, learning application performance history on the modular learning system 144, purchase history of learning applications as well as purchase history of a host of related microlearning purchase items like, for example, access to learning facility 132, access to tutor 112, and purchase of access to a learning tool. In one embodiment, a distinct Learning Application Authoring User Database is configured for receiving, storing, updating and retrieving a plurality of data fields of each learning application authoring user, say, user 104. In one embodiment, a distinct Independent Learning Facility Administering User Database is configured for receiving, storing, updating and retrieving a plurality of data fields of each independent learning facility administering user, say, user 124. In one embodiment, a distinct Learning Tools Supplying User Database is configured for receiving, storing, updating and retrieving a plurality of data fields of each learning tools supplying user, say, user 118. In one embodiment, a distinct Learning Visit Organizing User Database is configured for receiving, storing, updating and retrieving a plurality of data fields of each learning visit organizing user 114. In one embodiment, a distinct Learning Application Translating User Database is configured for receiving, storing, updating and retrieving a plurality of data fields of each learning application translating user, say, user 106. In one embodiment, a distinct Learning Application Certifying User Database is configured for receiving, storing, updating and retrieving a plurality of data fields of each learning application certifying user, say, user 108. In one embodiment, a distinct Learning Application Template Developing User Database is configured for receiving, storing, updating and retrieving a plurality of data fields of each learning application template developing user, say, user 110. In one embodiment, a distinct Learning Workshop Organizing User Database is configured for receiving, storing, updating and retrieving a plurality of data fields of each learning workshop organizing user, say, user 116. In one embodiment, a distinct Recruiting User Database is configured for receiving, storing, updating and retrieving a plurality of data fields of each recruiting user, say, recruiting user 120. In one embodiment, a distinct Funding User Database is configured for receiving, storing, updating and retrieving a plurality of data fields of each funding user, say, funding user 122.

In one embodiment, a distinct Institutional Learning Facility Administering User Database is configured for receiving, storing, updating and retrieving a plurality of data fields of each, institutional learning facility administering user, say, user 124. In one embodiment, a distinct Workspace Learning Facility Administering User Database is used to is configured for receiving, storing, updating and retrieving a plurality of data fields of each workspace learning facility administering user, say, user 124. In one embodiment, a distinct Temporary Learning Facility Administering User Database is configured for receiving, storing, updating and retrieving a plurality of data fields of each temporary learning facility administering user, say, user 124. In one embodiment, a distinct Learning Facility Database is configured for receiving, storing, updating and retrieving a plurality of data fields of a plurality of kinds of learning facilities, say, facility 132, as received from a plurality of kinds of learning facility administering users, say, user 124. In one embodiment, a distinct Learning Visits Database is configured for receiving, storing, updating and retrieving a plurality of data fields of each learning visit from the respective learning visit organizing user, say user 114. In some embodiments, the data fields of the databases in the above embodiments are used to determine purchase compatibility using purchase management module 238 and to determine performance compatibility using performance management module 240.

The learning application database 204 is configured for receiving, storing, updating and retrieving all the learning application metadata of all learning applications whose purchase is managed through the module 238. Optionally, all purchase related metadata of the learning application, like number of copies accessed per day, segmented by location, language, learning facility, user device, as well as other learning related purchase analytics metadata that may be generated during the purchase process may be received, stored, and updated by the microlearning purchase management module in the learning application database 204.

In one embodiment, the database 204 is configured for receiving, storing, updating and retrieving all the learning application metadata of all learning applications whose performance is managed through the module 240. Optionally, all performance related metadata of the learning application, like number of copies performed per day, segmented by location, language, learning facility, user device, as well as other learning related performance analytics metadata that may be generated during the performance process may be received, stored, and updated by the microlearning performance management module in the learning application database 204.

A subject database 206 is configured for receiving, storing, updating and retrieving a plurality of data fields of each subject linked or tagged to each learning application 300 in Subject Metadata 312. The subject database 206 provides a categorization system for the learning applications and enables learning application authoring users, like user 104, to categorize learning applications as belonging to one or more subjects by associating them with one or more subjects, such subjects then stored in subject metadata 312 of each authored learning application 300. The subject database 206 also allows users to search for learning applications according to particular subjects using the subjects associated with the learning applications. For example, a tutoring user 112 with a mathematics specialty may search the learning applications using the subject database 206 to identify mathematics learning applications for the tutor to associate his services with.

A tutor database 208 is configured for receiving, storing, updating and retrieving a plurality of data fields of each tutoring user, comprising the tutoring user's name, address, contact details, as well as learning related data fields like learning users to whom microlearning services have or are being provided, performance data and performance review data for the tutoring services, tutoring history outside the modular learning system 144, and remittance history. In some embodiments, the data fields are used to determine purchase compatibility using purchase management module 238 and to determine performance compatibility using performance management module 240.

A learning facility database 230 is configured for receiving, storing, updating and retrieving a plurality of data fields of a plurality of kinds of learning facilities such as learning facility 132 as received from learning facility administering users 124. In some embodiments, the data fields are used to determine purchase compatibility using purchase management module 238 and to determine performance compatibility using performance management module 240.

A learning tools database 232 is configured for receiving, storing, updating and retrieving a plurality of data fields of each learning tool or material from each learning tools supplying user 118. In some embodiments, the data fields are used to determine purchase compatibility using purchase management module 238 and to determine performance compatibility using performance management module 240.

Each of these databases, such as the tutor database 208, facilities database 230, and learning tools database 232, may also include information relating to purchase and performance compatibility. For example, a tutor in the tutor database may specify the tutor is only willing to teach students aged thirty to forty, or a learning facility may indicate it is only willing to allow entry to learning users who are a member of the facility.

A purchase management module 238 is configured for managing the purchase of learning applications and associated application services as a microlearning stack by the learning user 102.

A performance management module 240 is configured for managing the performance of learning applications and associated application services as a microlearning stack by the learning user 102.

A funding management module 242 is configured for managing the funding of learning applications and associated application services as a microlearning stack by the learning user 102. The funding management module 242 allows funding users to initiate funding for other users in the modular learning system 144. The funding user is able to select particular learning users or learning applications eligible for funding by the funding user. Alternatively, the funding user may designate particular attributes of a learning user or learning application eligible to receive funds. Learning users may also access the funding management module 242 to identify available funds that may be used by the learning user.

In one embodiment, the tutor database, learning facilities database, tools database and other application services databases form a single consolidated application services database in modular learning system 144.

Although the modular learning system 144 is described as being composed of various modules like databases and modules, the modular learning system 144 may comprise fewer or more databases, modules, and other modules. For example, the modular learning system 144 may include a Learning Application Genre Database, a Locational Learning Facility Price Range Database, a Learning Workshop Database, a Multilingual Dictionary Database, a Concept Tags Database, a Learning Objectives/Outcomes Database, and a Micro tutoring Services Database, and a Skill and Ability Tags Database. The modular learning system 144 may also include an Age Compatibility Module, a Learner Ranking Module, a Tutor Ranking Module, a Learner Billing Module, a Tutor Remittance Module, a Profile Management Module, a User Roles Management Module, a Learning Tools Management Module, a Learning Facility Management Module, Metadata Management Module, a Notification Module, a Recruitment Module, a Funding Module, a Map Module, a Learning Application Template Programming Interface Module, an Age Compatibility Module or a Translation Interface Module, with the present disclosure still falling within the scope of various embodiments. In some embodiments, an individual or group may play a plurality of user roles on the modular learning system, (e.g., tutoring user learning new applications as a learning user through another tutoring user, a learning application authoring user translating the authored application or developing the application template), with the present disclosure still falling within the scope of various embodiments.

In various embodiments the modular learning system 144 may be any of a web application, a mobile application, or an embedded module or subsystem of a social networking environment, a learning content management system, a learning management system, a professional networking environment, an electronic commerce system, an electronic payments system, a mobile operating system, a computer based operating system, or of a tablet based operating system, with the present disclosure still falling within the scope of various embodiments.

In one embodiment, a distinct roles management module is configured for managing and authorizing different roles associated with the various users of the modular learning system 144 and in the respective user databases. For example, the roles management module may provide distinct feature tabs and functionalities to each user based on the role associated with him or her. It can be noted that, the roles management module may enable a user to have one or more roles for accessing the modular learning system 144. For example, a tutoring user can avail the functionality and interface tabs of a learning user and also of a translating user if authorized by the modular learning system 144.

In one embodiment, a distinct metadata management module is configured for managing metadata associated with a plurality of specific learning applications, like learning application 300. In one embodiment, the metadata management module is configured for receiving, storing, updating and retrieving various types of metadata associated with each learning application 300 in the learning application database 204. In another embodiment, the metadata management module is configured for receiving and storing updated metadata of a specific learning application 300 in database 204 at regular intervals of time as updated by different users in authorized user roles and retrieving the required metadata when requested by the purchase management module 238 and the performance management module 240 for determining compatibility and performance compatibility of requested microlearning service stack respectively. In yet another embodiment, the metadata management module enables various users of the modular learning platform to update metadata associated with specific learning applications in the learning application database according to their user role.

It is appreciated that, in some embodiments, various databases like 202, 204, 206, 208, 230, and 232, modules 238, 240 and 242 as well as the databases, modules, components and engines of the above embodiments may be stored in the form of machine readable instructions in the memory of the modular learning system 144 and executed by a processor of the modular learning system 144 to perform one or more embodiments disclosed herein. Alternatively, the various databases like 202, 204, 206, 208, 230, and 232, modules 238, 240 and 242 as well as the databases, modules, components and engines of the above embodiments may be implemented in the modular learning system in the form of an apparatus configured to perform one or more embodiments disclosed herein.

FIG. 3A is a block diagram of a learning application 300, according to one embodiment. Each learning application 300 comprises a plurality of kinds of application metadata in addition to the instructional content and associated media for a particular topic or subject. The instructional content and media of each learning application 300 may comprise a specific unit of instruction for a particular portion of knowledge or a skill, and may vary widely in scope. The learning application 300 may be very narrow in scope, such as "treading water" or may be broad in scope, such as "overview of world history", depending on the authoring process of learning application authoring user 104. The learning application 300 could indicate a theoria (to think, a theory based application using primarily memory, reasoning, logic) performance type or a praxis performance type (to do, a practical performance type or a poeisis performance type). The learning application 300 may comprise metadata indicating associated application services for purchasing or performing the learning application 300 like tutor metadata 336, tools metadata 322 and learning facility metadata 316. In one embodiment, the learning application 300 may be requested for purchase or performance with associated application services as a microlearning service stack, wherein the application services comprise of access to tutoring user 112, access to a learning tool from learning tools database 232 and access to a learning facility from facilities database 230. For example, the media metadata 326 of a learning application 300 provided by learning application authoring user 104 may specify instructions for learning how to swim a breaststroke, but the media metadata 326 does not typically specify individual pools i.e. learning facilities to perform the learning application or tutors to coach and review the performance. Rather, the application services metadata like tutor metadata 336, tools metadata 322 and learning facility metadata 316 indicates tutors, tools, and facilities which the learning user may choose to perform the learning application's instructions.

The Certification Metadata 302 is configured for receiving, storing, retrieving, displaying and updating certification history as well as live certifications of the learning application 300, including, for example, a certification from educational board 108 and another educational board in another state, present as a certifying user in database 202 or a distinct certifying user database. In some embodiments, the certification metadata is also used to determine purchase compatibility in the microlearning purchase management module 238 through learning application database 204 and to determine performance compatibility in the microlearning performance management module 240 through learning application database 204.

The Scoring Metrics Metadata 304 is configured for receiving, storing, retrieving, displaying and updating a plurality of metrics for quantitative and qualitative scoring as defined and updated for learning application 300 by learning application authoring user 104. In some embodiments, the quantitative scoring of each metric is conducted during the performance by a dedicated module within the learning application 300 itself, while in other embodiments of a performance, especially a non-screen based praxis or poeisis performance, the quantitative and optionally, qualitative score for each metric is received through a user device 140 from the learning user 102 and/or the tutoring user 112. In some embodiments, the scoring metrics metadata is also used to determine purchase compatibility in the microlearning purchase management module 238 through learning application database 204 and to determine performance compatibility in the microlearning performance management module 240 through learning application database 204.

The Language Metadata 306 is configured for receiving, storing, retrieving, displaying and updating a plurality of translations of all user viewable application metadata for learning application 300 translated by, for example, learning application translating user 106 into Bengali, comprising of media metadata 326 like instructional text, subtitles to audio and video instructions, and all other linguistic content for the preview, performance and review of learning application 300 by learning user 102 and preview and review of the learning performance by tutoring user 112. In some embodiments, metadata 306 further comprises translations in at least one other language, of performance type metadata 308, duration metadata 310, subject links and tags metadata 312, age level metadata 314, learning facility metadata 316 authoring metadata 318, sequence metadata 320, tool metadata 322, mode metadata 324, medium metadata 328 and job skill metadata 330. In some embodiments, the language metadata is also used to determine purchase compatibility in the microlearning purchase management module 238 through learning application database 204 and to determine performance compatibility in the microlearning performance management module 240 through learning application database 204.

The Performance Type Metadata 308 is configured for receiving, storing, retrieving, displaying and updating the performance type of the learning application 300. For example, the metadata 308 could indicate a theoria (to think, a theory based application using primarily memory, reasoning, logic, like a 'Biomechanics of Swimming' Pop Quiz) performance type or a praxis performance type (to do, a practical performance type like an 'eight hundred Freestyle Swim as per Olympic performance guidelines' or a poeisis performance type (to make, a creation oriented performance type like a 'five minute Synchronized Swimming Choreography'), such that the learning user is already aware of the task or performance type before purchasing and performing the learning application 300. In some embodiments, the performance type metadata is also used to determine purchase compatibility in the microlearning purchase management module 238 through learning application database 204 and to determine performance compatibility in the microlearning performance management module 240 through learning application database 204.

The Duration Metadata 310 is configured for receiving, storing, retrieving, displaying and updating the suggested duration of the learning application 300. In some embodiments, the metadata 310 indicates a fixed duration like, fifteen minutes, or thirty minutes, or one hour, while in other embodiments, the metadata indicates a variable duration with, optionally, a predetermined minimum or maximum duration depending on the duration metadata set by the learning application authoring user 104. In some embodiments, the duration metadata is also used to determine purchase compatibility in the microlearning purchase management module 238 through learning application database 204 and to determine performance compatibility in the microlearning performance management module 240 through learning application database 204.

The Subject Metadata 312 is configured for receiving, storing, retrieving, displaying and updating a plurality of subject links and tags attached to the learning application 300 by the learning content application authoring user from among the subject links and tags present in the Subject Database 206. In some embodiments, the subject links and tags are attached to specific concepts or terms within the Media Metadata 326. In some embodiments, the subject link/tag metadata is also used to determine purchase compatibility in the microlearning purchase management module 238 through learning application database 204 and to determine performance compatibility in the microlearning performance management module 240 through learning application database 204.

The Age Level Metadata 314 is configured for receiving, storing, retrieving, displaying and updating the suggested age level of the learning user 102 for performance of the learning application 300. In some embodiments, the age level is set as a minimum suggested age say, for example, ten plus by the learning application authoring user 104. In other embodiments, a range of suggested learner ages is set by the learning application authoring user 104. In some embodiments, the age level metadata is also used to determine purchase compatibility in the microlearning purchase management module 238 through learning application database 204 and to determine performance compatibility in the microlearning performance management module 240 through learning application database 204.

The Learning Facility Metadata 316 is configured for receiving, storing, retrieving, displaying and updating the suggested learning infrastructure required in a learning facility for performance of the learning application 300. In some embodiments, such learning facilities and infrastructure (e.g., Olympic Sized Swimming Pool) required for the performance of the learning application (e.g., eight hundred meters Freestyle to Olympic Guidelines) is received and updated by the learning application authoring user 104 by picking the same from a learning facility database 230 available on the modular learning system 144. In other embodiments the metadata 316 is received and updated by the administering user 124 of learning facility 132. In some embodiments, the learning facility metadata is also used to determine purchase compatibility in the microlearning purchase management module 238 through learning application database 204 and to determine performance compatibility in the microlearning performance management module 240 through learning application database 204.

The Authoring Metadata 318 is configured for receiving, storing, retrieving, displaying and updating the authoring metadata received by the learning application author 104, including for example the name, signature, contact details, intellectual property disclaimer and other information of the user or user group. In some embodiments, the metadata also includes metadata generated by the modular learning system 144 during the authoring user's editing process, including the version history, tracked changes and time stamps of edits and updates to the learning content application. In some embodiments, the metadata may also include citations to other learning content applications or other learning content application authoring users made by the user 104.

The Sequence Metadata 320 is configured for receiving, storing, retrieving, displaying and updating the suggested sequence of performance of the learning application 300 relative to another learning application. The sequence metadata may indicate if the learning application should be performed before, after, instead of, or with another learning application by learning application authoring user 104. The user 104 may wish for any learning user, say 102 to perform an advanced microbiology learning application 300 only after performing a corresponding beginner's microbiology learning application, irrespective of the learning user's age or quality of performance. In other embodiments, wherein the learning application authoring user is not the author of the suggested beginner's application, the user 104 may input a sequence suggesting to the learning user 102 to perform the learning application before or after a learning application authored by another learning application authoring user. In some embodiments, the sequence metadata is also used to determine purchase compatibility in the microlearning purchase management module 238 through learning application database 204 and to determine performance compatibility in the microlearning performance management module 240 through learning application database 204.

The Tool Metadata 322 is configured for receiving, storing, retrieving, displaying and updating the compatible tools or learning materials to the learning application 300. In some embodiments, the tool compatibility is received from and updated by the learning application authoring user 104 by accessing the tool database 232. In other embodiments, the tool compatibility is received and updated by the learning tools supplying user 118 by accessing the learning application database 204. In still other embodiments, the tool compatibility may be updated by the modular learning system 144. In some embodiments, the tool metadata is used to determine purchase compatibility in the microlearning purchase management module 238 through learning application database 204 and to determine performance compatibility in the microlearning performance management module 240 through learning application database 204. In some embodiments, wherein the learning tool is a peripheral input device which can be connected to the user device 140 during the learning application performance (e.g., Electric Guitar attached to a user device 140 during an 'Introduction to Hard Rock' learning application) the Tool Metadata includes the compatibility to the user device 140. In other embodiments, wherein the learning material is not material to the user device 140, (e.g., Sulphuric Acid during a Chemistry Experiment) the Tool Metadata may not include any additional user device compatibility.

The Mode Metadata 324 is configured for receiving, storing, retrieving, displaying and updating the available modes of performance of the learning application. In some embodiments, the mode metadata is determined by the modes chosen by the learning content application authoring user from the learning application template chosen. In various embodiments, the learning application may comprise an individual learner performance mode, a learner plus learner cooperative performance mode, a learner versus learner competitive performance mode, a learner plus tutor cooperative performance mode, a learner versus tutor competitive performance mode, a limited plurality of learners (e.g., four learners) cooperative performance mode, a limited plurality of learners (e.g., four learners) competitive performance mode, a tutor plus limited plurality of learners (e.g., nine learners) cooperative performance mode (a typical classroom mode). Although the Mode Metadata is described as being composed of various available modes as chosen by the learning application authoring user, various other modes (e.g., a limited plurality of learners vs. a limited plurality of learners competitive performance mode) may comprise the Mode Metadata 324 and still fall within the scope of various embodiments. In some embodiments, the various Media Metadata for the preview, performance and review screens for each mode of the same learning application and the sequence of the same (especially wherein the learning application 300 is performed by multiple users from the same user device and, optionally, by viewing the same display device) is received, stored, retrieved, displayed and updated in the Media Metadata 326. In some embodiments, the mode metadata is also used to determine purchase compatibility in the microlearning purchase management module 238 through learning application database 204 and to determine performance compatibility in the microlearning performance management module 240 through learning application database 204.

The Media Metadata 326 is configured for receiving, storing, retrieving, displaying and updating text, image, audio, video, animation, links and other interactive elements of the learning content application as received and updated by the learning application authoring user 104 during the publishing and revision of the learning content application 300. In other embodiments, the learning application Media Metadata may comprise the theoria, praxis or poeisis task or, optionally, plurality of tasks to be completed during the performance, their sequence, and, optionally, the learning outcomes and objectives of the same. In some embodiments, the media metadata is also used to determine purchase compatibility in the microlearning purchase management module 238 through learning application database 204 and to determine performance compatibility in the microlearning performance management module 240 through learning application database 204.

The Medium Metadata 328 is configured for receiving, storing, retrieving, displaying and updating the medium of access to the learning application preview, review and performance screen during the microlearning performance. For example, for a Beginner's Kathak Dancing microlearning Application, in addition to requiring a compatible learning facility and tutoring user, the learning application authoring user 104 or, optionally, modular learning system 144 may require the preview and review screen to be viewable only on a display device connected to a learning console user device or the display device of a computer device but not a mobile device screen to ensure an optimum learning experience. In another case, for a Kathak Quiz microlearning application, the learning application authoring user 104 or, optionally, modular learning system 144 may require the performance screen, preview screen and review screen to be viewable only on a mobile device screen but not on a display device connected to a learning console user device, or the display device of a computer device. In some embodiments, the medium metadata may further comprise the compatibility to a plurality of software platforms and, optionally, runtime environments as determined by the modular learning system 144. In some embodiments, the medium metadata is also used to determine purchase compatibility in the microlearning purchase management module 238 through learning application database 204 and to determine performance compatibility in the microlearning performance management module 240 through learning application database 204.

The Job Skill Metadata 330 is configured for receiving, storing, retrieving, displaying and updating the skills and abilities tagged to the learning application 300 by the learning application authoring user 104, the recruiting user 120 or, optionally, the modular learning system 144 from a skills and abilities database provided by the modular learning system 144. In some embodiments, the metadata is used by a recruiting user 120 to post the completion of the learning application (optionally, in a controlled testing environment) or group of applications as a minimum requirement for a particular job role to a plurality of potentially employable learning users. In other embodiments, the metadata is used by the recruiting user 120 to post the requirement of completion of the learning application 300 (optionally, in a controlled testing environment) or group of applications as a minimum requirement for a promotion to a higher post in a particular organization, to a plurality of potentially employable learning users. In some embodiments, the job skill metadata is also used to determine purchase compatibility in the microlearning purchase management module 238 through learning application database 204 and to determine performance compatibility in the microlearning performance management module 240 through learning application database 204.

The Error Metadata 332 is configured for receiving, storing, retrieving, displaying and updating the potential errors which can be made by the learning user 102 (e.g., ten potential errors in an auditing microlearning application), as determined by the learning application authoring user 104. In some embodiments, wherein the learning application (e.g., a Karnataka History Quiz) is performed through an input device on a user device 140 itself, the error metadata may be synchronized to each potential input point during the learning application 300 performed through the user device 140 by the learning application authoring user 104. In some embodiments, wherein the learning application (e.g., a Karate kata) 300's error metadata is outside the recordable boundaries of the user device 140, the potential errors may be entered with reference to each instructional step of the performance by the learning application authoring user 104, such that at the time of the performance, the tutoring user (or, in some modes, the learning user 102 himself, another learning user, or the recruiting user 120) may note errors in each observable step of the performance and confirm the same on user device 140 to generate the score. In other embodiments, wherein the error observed by the observing user (say, tutoring user 112) is not part of the potential errors in the Error Metadata 332 of the application 300, the tutoring user 112 may update such errors to the Errors Metadata, or optionally, send the same to the learning application authoring user 104, to be updated after review. In some embodiments, the error metadata is also used to determine purchase compatibility in the microlearning purchase management module 238 through learning application database 204 and to determine performance compatibility in the microlearning performance management module 240 through learning application database 204.

The Template Metadata 334 is configured for receiving, storing, retrieving, displaying and updating the default script, formatting and media modules of the learning application template used to author the learning application 300. In some embodiments, wherein a particular sequence and format of the same has been chosen by the learning content application authoring user from the options offered in the template developed by the learning application template developing user, the chosen setting may be a part of the Template Metadata 334. In various embodiments, the learning application templates may comprise a quiz, role play, simulation, project, experiment, essay, recital, research paper, race, challenge, problem, game, question, exercise or problem set. In some embodiments, the templates may be for performances conducted and supervised in front of a display device with an input device connected to the user device 140, while in other embodiments the templates may be for previews, reviews and guidelines for performances conducted without the input device, with the user device 140 merely placed next to the performance area or learning station (e.g., for Praxis Tasks in Dance Applications) as a reference point. Although the Template Metadata is described as being composed of various available templates as developed by the learning application template authoring user and chosen by the learning application authoring user, various other templates (e.g., a Swimming Race Template, a Patent Drafting Template) may comprise the Template Metadata 334 and still fall within the scope of various embodiments. In some embodiments, the template metadata is also used to determine purchase compatibility in the microlearning purchase management module 238 through learning application database 204 and to determine performance compatibility in the microlearning performance management module 240 through learning application database 204.

The Tutor Metadata 336 is configured for receiving, storing, retrieving, displaying and updating the compatibility of tutoring users to learning content application. In some embodiments, the tutoring user compatibility is received from and updated by the tutoring user 112 by updating the tutor database 208 (e.g., a Mathematics Tutoring User whose medium of instruction is Mandarin updating compatibility to a plurality of Mathematics microlearning applications available in Mandarin, in the tutor database 208). In other embodiments, the tutoring user compatibility metadata is received from and updated by the tutoring user 112 by accessing the learning application database 204. In still other embodiments, the tutoring user compatibility metadata may be updated by the modular learning system 144. In some embodiments, the Tutor Metadata is also used to determine purchase compatibility in the microlearning purchase management module 238 through learning application database 204 and to determine performance compatibility in the microlearning performance management module 240 through learning application database 204.

In various embodiments, the metadata of learning application 300 is configured for retrieving, displaying to and updating by a plurality of kinds of users as may be applicable to the kind of metadata and the kind of user. Optionally, in addition to receiving and storing the metadata, the modular learning system 144 may update the learning application metadata as and when generated in the system through a dynamic metadata update module or through a dedicated administering user. In some embodiments, the learning application authoring user 104 may further play the role of the learning application template developing user. In some embodiments, the modular learning system 144 may play the role of the learning application authoring user 104 and, optionally, the role of the learning application template developing user 110 to author and update the media and template metadata of the learning application 300.

In some embodiments, the microlearning purchase management module 238 and microlearning performance management module 240 retrieve some or all of the above metadata associated with the learning application 300 from a learning application database 204 in a repository module of the modular learning system 144.

In some embodiments, the media metadata 326 of the learning application may comprise an electronic textbook, an electronic journal, an instructional video, or an instructional animation. In some embodiments each learning application 300, may be a distinct mobile application, browser based web application, or a desktop application. In some embodiments, each learning application 300 may be an executable file, a program, add in, macro, plug-in, or other program of instructions associated with a plurality of application programming interfaces of the modular learning system 144.

Although the learning application 300 is described as comprising various metadata and associated data fields stored and updated in learning application database 204, fewer or more metadata and associated data fields (e.g., Application Programming Interface Metadata, Organization versus Organization Social Learning Mode Metadata, University versus University Social Learning Mode Metadata, Testing Metadata, Learning Visits Metadata, Learning Workshops Metadata, Tutorials Metadata) may comprise the Learning Application 300 and associated learning application database 204, with the present disclosure still falling within the scope of various embodiments. In some embodiments, each version of the same learning application 300 with different metadata, for example language metadata, is treated as a distinct learning application in learning application database 204.

In some embodiments, an authorization to update certification metadata 302 of a learning application 300 is limited to a predetermined plurality of certifying users like user 108 and recruiting users like user 120. In some embodiments, an authorization to update scoring metrics metadata 304, performance type metadata 308, age level metadata 314, authoring metadata 318, mode metadata 324, media metadata 326, medium metadata 328, and error metadata 332 of a learning application 300 is limited to a predetermined plurality of learning application authoring users like user 104. In some embodiments, an authorization to update language metadata 306 of a learning application 300 is limited to a predetermined plurality of learning application translating users 106. In some embodiments, an authorization to update duration metadata 310 of a learning application 300 is limited to a predetermined plurality of learning application authoring users like user 104 and learning application template developing users like user 110. In some embodiments, an authorization to update subject link/tag metadata 312 of a learning application 300 is limited to a predetermined plurality of users in any user role. In various embodiments, such authorizations may be set by an administrator of system 144 based on the user role, user profile information and user preferences information of the corresponding users.

In some embodiments, an authorization to update learning facility metadata 316 of a learning application 300 with associated learning facilities is limited to a predetermined plurality of learning facility administering users like user 124. In some embodiments, an authorization to update sequence metadata 320 of a learning application 300 is limited to a predetermined plurality of learning application authoring users like user 104 and tutoring users like user 112. In some embodiments, an authorization to update tool metadata 322 of a learning application 300 with associated learning tools is limited to a predetermined plurality of tool supplying users like user 118. In some embodiments, an authorization to update job skill metadata 330 of a learning application 300 is limited to a predetermined plurality of recruiting users like user 120. In some embodiments, an authorization to update template metadata 334 of a learning application 300 is limited to a predetermined plurality of learning application authoring users like user 104 and a predetermined plurality of template developing users like user 110. In some embodiments, an authorization to update tutor metadata 336 of a learning application 300 with associated tutoring services is limited to a predetermined plurality of tutoring users like user 112. In some embodiments, an authorization to update an optional learning event metadata of a learning application 300 with associated learning workshops, visits and other learning events is limited to a predetermined plurality of learning workshop organizing users like user 116 and learning visit organizing users like user 114. In some embodiments, the associations of application services to learning applications are enabled automatically by a metadata association module in the system 144. In some embodiments, each learning application 300 is associated with a subset of learning facilities in a learning facilities database 230. In some embodiments, each learning application 300 is further associated with a subset of learning stations of each associated learning facility. In some embodiments, each learning application is associated with a subset of tutors in a tutor database 208. In some embodiments, each learning application is associated with a subset of tools in a learning tools database 232.

Figure 3B:
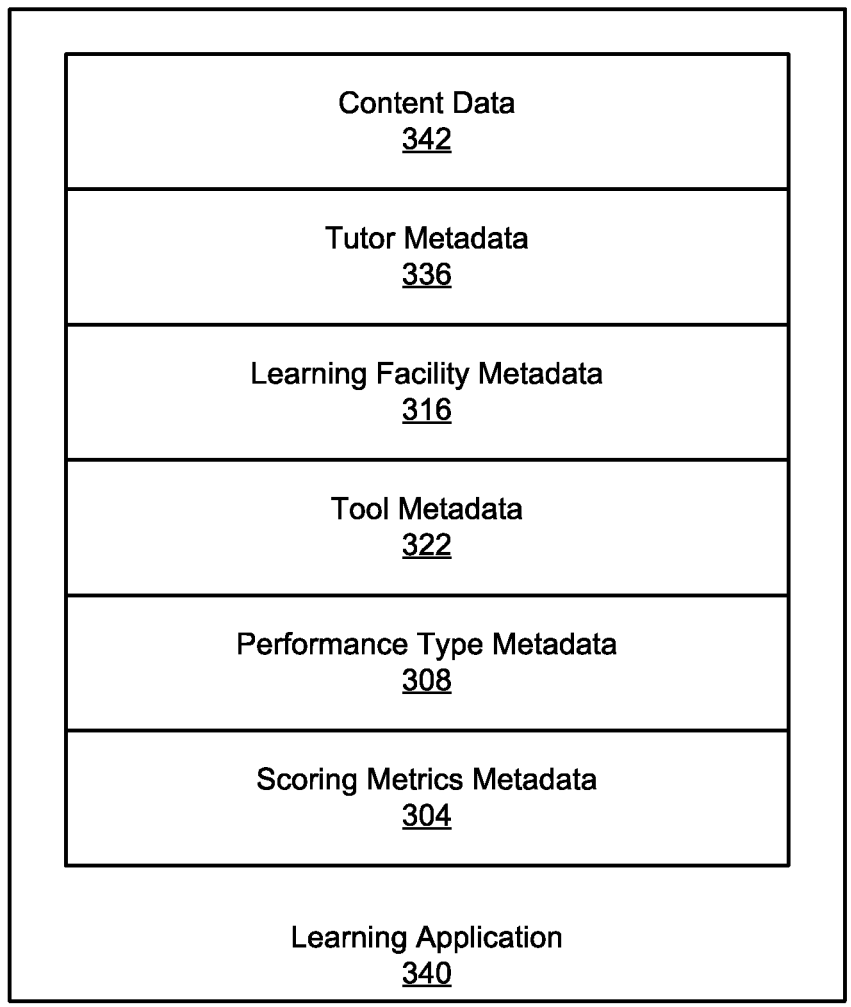
FIG. 3B is a block diagram of a learning application according to an alternative embodiment.

FIG. 3B is a block diagram of a learning application 340 according to another example embodiment. The learning application 340 is illustrated to depict metadata of the learning application related to a microlearning service stack. The learning application 340 also illustrates some other performance data used during its performance by a learner. This microlearning service stack may be requested for purchase or performance by learning user 102. In this embodiment, the microlearning service stack includes a learning application 340, a time based tutoring service by a particular tutor in database 208, time based access to a particular learning facility from database 230, and access to a particular tool from database 232. The particular services above may or may not be associated with the corresponding tutor metadata, facilities metadata, and tool metadata of learning application 340 at the time of a request. The learning application 340 includes content data 342 which designates particular content media and content attributes of the learning application 340. The learning application also includes other metadata as described above, such as tutor metadata 336, learning facility metadata 316, learning tool metadata 322, performance type metadata 308, and scoring metrics metadata 304. As such, the learning application 340 illustrates some aspects of the learning application used for purchase or performance of the learning application 340 by a learner as part of a microlearning service stack, such as content, tutors, facilities, and tools. The learning application 340 may also include any other metadata as described above with reference to FIG. 3A. Any other metadata as described above with reference to FIG. 3A may also be part of the content data 342 of the learning application 340.

The lifecycle of a learning application 300 is now described according to one embodiment. Initially, a learning application template developing user 110 creates a learning application template stored in a distinct template database in a modular learning system 144. Next, the learning application authoring user 104 publishes learning application content stored as media metadata of the learning application 300. In case a template has been chosen for the application 300, the template metadata is stored as well. The tutor metadata, learning facility metadata, learning tool metadata and other optional application services metadata indicating tutoring services, learning facilities, learning tools, and other application service types associated with the learning application 300 are dynamically updated by the corresponding tutoring users, learning facility administrators, tool suppliers and other application service providers. At this point, the learning user may modularly select application services in a microlearning stack to purchase or perform the learning application. Next, the learning user 102 selects the learning application 300 and identifies application services requested for purchase or performance as a consolidated stack. The approval of the purchase or performance request for learning application 300 and particular application services in the microlearning service stack may be determined by the specific metadata of the learning application 300 being associated with corresponding application services, and other specific metadata of the learning application being compatible with the profile information and preferences of the learning user.

Figure 4:
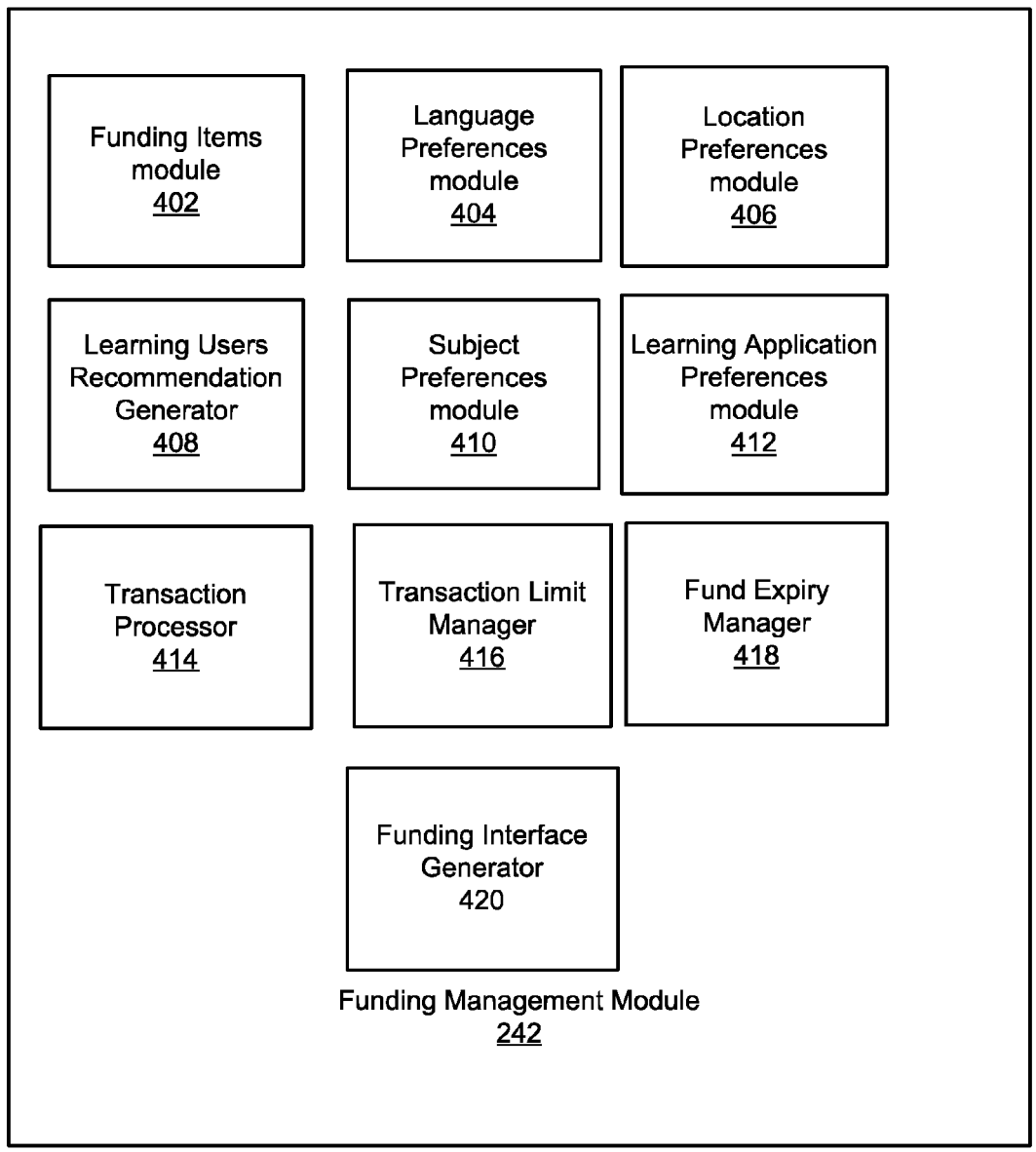
FIG. 4 is a block diagram of a funding management module according to one embodiment.

FIG. 4 is a block diagram of a funding management module 242. The funding items database 402 is configured for generating, storing, retrieving and updating a plurality of funding items for each unique funding transaction conducted by one or a plurality of funding users on the modular learning system 144. In various embodiments, each unique funding item is updated at various times before, during and after the funding transaction in a plurality of data fields based on the language preferences, location preferences, topic preferences and learning application preferences as well as transaction limit and fund expiry preferences of each unique funding item. In some embodiments, a unique funding item is generated by the funding items module 402 for each funding transaction with each learning user 102.

The language preferences module 404 is configured for receiving, storing, retrieving and updating a plurality of language preference item choices displayed with corresponding language preference input areas to be chosen by funding user 122 to determine the preferred learning users to be funded when the users to be funded have not been predetermined by funding user 122 (e.g., a funding user in Spain may wish to fund a plurality of learning users whose preferred medium of instruction is Spanish). The preference items in language preferences module 404 are accessed by generator 408 to determine preferred or recommended learning users for funding by the funding user 122, and the generator 408 may correlate the preference items against the corresponding identity items of the learning users in user database 202 to determine the recommended learning users for display to funding user 122.

The location preferences module 406 is configured for receiving, storing, retrieving and updating a plurality of location preference item choices displayed with corresponding location preference input areas to be chosen by funding user 122 to determine the preferred learning users to be funded in case the users have not been predetermined by funding user 122. For example, a funding user in South Africa may wish to fund a plurality of learning users whose nationality is South African and the funding user can set the location preferences for the funding items accordingly. The preference items in module 406 are accessed by learning user recommendation generator 408 to determine recommended learning users for funding by the funding user 122, and the generator 408 may compare the preference items against the corresponding identity items of the learning users in database 202 to determine recommended learning users for display to funding user 122.

The learning user recommendation generator 408 is configured for receiving funding preferences from among funding preference item choices chosen by the funding user 122 from language preferences database 404, location preferences module 406, subject preferences module 410 and learning application preferences module 412. The learning user recommendation generator 408 accesses the plurality of identity items of each learning user in learning user database 202 and determines recommended learning users for funding based on the funding preferences received from the funding user 122. In some embodiments, the learning user recommendation generator 408 may further access the performance privacy preferences of each preferred learning user to determine if the performance items of the learning user can be made accessible to particular funding users 122 or to all funding users 122.

The subject preferences module 410 is configured for receiving, storing, retrieving and updating a plurality of subject preference item choices displayed with corresponding subject preference input areas to be chosen by funding user 122 to determine the preferred learning users to be funded in case the users have not been predetermined by funding user 122. For example, a funding user like the Government of Maharashtra may wish to fund mathematics subject learning applications to improve mathematics scores of learning users in the state. The preference items in subject preferences module 410 are accessed by learning user recommendation generator 408 to determine recommended learning users for funding by the funding user 122, and the learning user recommendation generator 408 may correlate the preference items against the corresponding identity items of the learning users in user database 202 to determine the preferred or recommended learning users for display to funding user 122.

The learning application preferences module 412 is configured for receiving, storing, retrieving and updating a plurality of learning application preference items chosen by funding user 122 to determine the preferred learning users and learning applications to be funded in case the users have not been predetermined by funding user 122 (e.g., a funding user like the International Cricket Council may wish to fund a plurality of learning users in one hundred preferred praxis cricket learning applications). In some embodiments, the funding user 122 may further choose a plurality of kinds of learning application preferences based on a plurality of kinds of metadata of the plurality of learning applications published on the modular learning system 144 and stored in a learning application database and a learning application metadata module of system 144 (e.g., a funding user may prefer to fund a plurality of learning users for a subset of the plurality of learning applications in the learning applications database, whose Age Level Metadata indicates that the learning applications are appropriate for learning users above the age of seven and Subject Metadata indicates that the learning applications are biology applications). The preference items in learning application preferences module 412 are accessed by learning users recommendation generator 408 to determine preferred or recommended learning users for funding by the funding user 122, and the generator 408 may correlate the preference items against the corresponding identity items of the learning users in database 202 to determine the recommended learning users for display to funding user 122.

The transaction processor 414 is configured for processing funding transactions between funding users 122 and learning users 102. The transaction processor further updates the account balance data field of the funding user 122 in a funding user database (not shown in the figures) and the fund balance item of the learning user or plurality of learning users in the learning user database 202.

The transaction limit manager 416 is configured for receiving, storing, retrieving and updating a plurality of transaction limit preferences for each funding item in funding items module 402. The transaction limit manager 416 may be further accessed by funding items module 402 to retrieve and update the transaction limit preferences for each funding item during a microlearning purchase request from a funded learning user or, optionally, at predetermined intervals of time.

The fund expiry manager 418 is configured for receiving, storing, retrieving and updating a plurality of fund expiry preferences for each funding item in module 402. The transaction limit manager 416 may be further accessed by funding items module 402 to retrieve and update the fund expiry preferences for each funding item during a microlearning purchase request from a funded learning user or, optionally, at predetermined intervals of time.

The funding interface generator 420 is configured for generating a plurality of funding management interface items and corresponding input areas to be chosen or filled in by each funding user 122 during the management of one or a plurality of microlearning funds for one or a plurality of learning users present in database 202 on the modular learning system 144. In various embodiments, the funding interface generator 420 may access a plurality of data items from a plurality of other modules and, optionally, managers, in the funding management module 242, and generate the corresponding interface items for display to the funding user 122 through a funding management interface. The generator 420 displays the interface items through a funding management interface to each funding user 122 on the user 122's user device 140.

Although the funding management module is described as being composed of various modules, fewer or more modules (e.g., Learning Application Metadata Preferences Module, Funding User Database Module) could comprise the module, with the present invention still falling within the scope of various embodiments.

Figure 5:
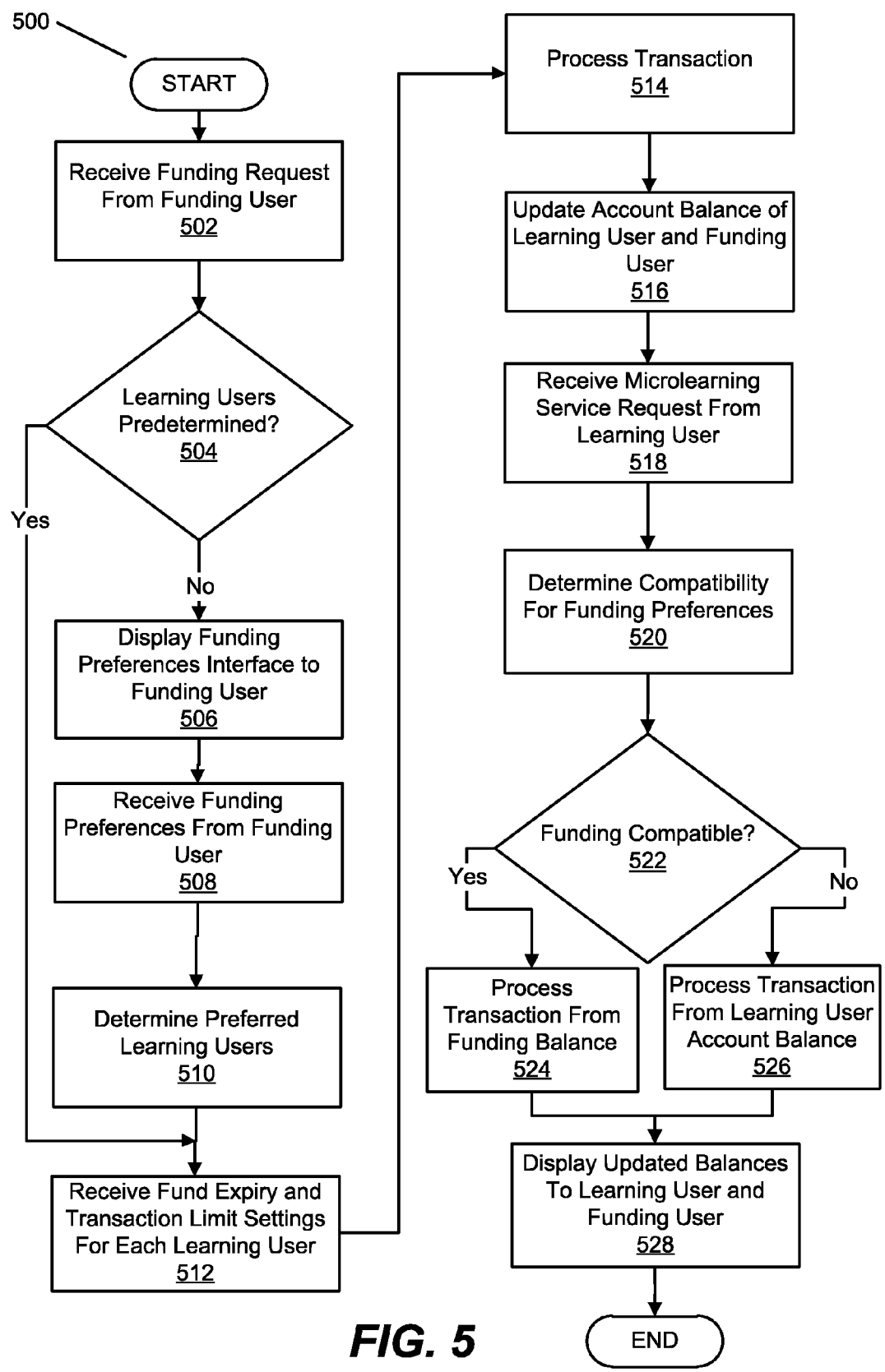
FIG. 5 is a flow diagram of a method for managing funding transactions in a modular learning system environment 500 according to one embodiment.

FIG. 5 is a flow diagram 500 of a method for managing funding transactions in a modular learning system environment according to one embodiment. At step 502, the funding management module 242 receives a funding request from a funding user 122, in the modular learning system 144 through an interface generated by funding interface generator 420 and displayed on funding user 122's user device 140. At step 504, the funding management module 242 determines whether the funding user 128 has predetermined specific learning users to receive funding. When the learning user 102 or a plurality of learning users requested to be funded is predetermined, the funding management module 242 directly proceeds to receive fund expiry and transaction limit preferences for learning user 102 or a plurality of learning users through a funding preferences interface and corresponding input areas generated by generator 420 and displayed to user 122 on the user's user device 140.

At step 506, when the learning user 102 or a plurality of learning users designated for funding are not predetermined by funding user 122, the funding management module 242 proceeds to display a funding preferences interface with interface items for language preferences, location preferences, subject preferences and other constraint preferences along with corresponding input areas to be chosen or filled in by funding user 122. The interface and corresponding interface items and input areas generated by generator 420 and displayed to the funding user 122 on the funding user 122's user device 140.

At step 508, the learning user recommendation generator 408 receives funding preferences from among funding preference item choices accessed by funding interface generator 420 in the previous step from language preferences module 404, location preferences module 406, subject preferences module 410 and learning application preferences module 412 and displayed to funding user 122 with corresponding input areas in the previous step.

At step 510, the learning user recommendation generator 408 accesses the plurality of identity items or identity information of each learning user in learning user database 202 and determines the recommended learning users to be funded based on the funding preferences received from the funding user 122. The funding interface generator 420 displays a plurality of accessible identity items of the preferred learning users with corresponding fund expiry and transaction limit input areas to be chosen or filled in for each of the learning users (or individual subsets of learning users) chosen to be funded by the funding user 122. In some embodiments, the generator 408 may further access the performance privacy preferences of each preferred learning user to determine if the performance items of the learning user can be made accessible to the funding user 122 or, optionally, the entire plurality of funding users on modular learning system 144. In an embodiment, the privacy information anonymizes learning user information. In embodiments, wherein one, some or all of the preferred learning users whose identity items are displayed by generator 420 have authorized the funding user 122 or, optionally, all funding users on the modular learning system 144 to view the performance items of each learning application performance conducted by the users on or through system 144. The interface generator 420 is authorized to further access the performance information of the learning user or a plurality of learning users from learning user database 202 and, optionally, from the microlearning performance management module 240 and display the same to funding user 122 along with the other identity items and input areas of the learning user or plurality of learning users, on funding user 122's user device 140. In one embodiment, the funding user may indicate preferred performance levels for funding learning users. The learning user recommendation generator 408 may provide learning users that have performed in the specified performance levels to the funding user without exposing the actual performance scores to the funding user. In an embodiment, the step 510 of selecting the learning user for funding comprises providing a description of a set of learning users whose identity information is described by the funding preferences to the funding user via the user device and receiving a selection of learning user by the funding user.

At step 512, the fund expiry manager 418 receives the preferred date of expiry of the funded amount for each learning user being funded. The step further comprises of receiving fund spending limits by the transaction limit manager 416, for one or a plurality of microlearning purchase transactions authorized to be conducted by each learning user through the microlearning purchase management module 238. In some embodiments, the fund spending limit may be further set for one or a plurality of predetermined intervals of time, to authorize each learning user to use a preferred limited amount from the total funded amount in each such predetermined or preferred interval of time (e.g., $10 only in January, $15 in February and March, $20 in April, May and June with the learning user's fund expiring on $30^{th}$ June of that year). In other embodiments, the transaction limit may be the entire funded amount with the corresponding transaction limit item simply indicating that no amount greater than the entire funded amount may be used from the funding user 122's fund balance by the learning user from the date of funding until the date of fund expiry.

At step 514, the transaction processor 414 processes the funding transaction and remits the net amount to the learning user. When a plurality of learning users are funded at the same time, the transaction processor 414 processes a plurality of funding transactions and remits the net amount to each learning user.

At step 516, the transaction processor 414 further updates the funding item for each funding transaction in module 402 and updates the account balance of each learning user and of the funding user 122 in the corresponding account balance data fields of each funded learning user in user database 202 and the funding user 122 in a funding user database in the funding management module 242 of the modular learning system 144.

At step 518, before the fund expiry date for a funded learning user 102, the microlearning purchase management module 238 receives a microlearning purchase request (and/or microlearning service request from learning user) from the learning user 102 for a learning application, application service or learning event for sale on modular learning system 144. At step 520, the microlearning purchase management module 238 provides a request to the funding management module 242 for access to the funding items module 402 to determine compatibility of the purchase request to the funding preferences of the microlearning fund.

At step 522, the microlearning purchase management module 238 accesses the funding preference data fields of the unique funding item of the learning user 102 in funding items module 402 to determine compatibility of the purchase request to the funding preferences chosen by funding user 122 for the learning user 102's microlearning fund.

At step 524, when the microlearning purchase management module 238 determines that the microlearning purchase request is compatible with the funding items or, when a plurality of funding users for the same learning users, compatible with one of the plurality of funding items of the learning user 102 in module 402, the microlearning purchase management module 238 processes the transaction from the available fund balance of the learning user. When a plurality of funds and corresponding funding users are compatible with the learning user's purchase request, the module 238 may receive the preferred fund from which to process the transaction through an input from the learning user through an interface generated by a generator and displayed on learning user 102's user device. The microlearning purchase management module 238 accesses the funding preference data fields of the unique funding item of the learning user 102 in funding items module 402 to determine compatibility of the purchase request to the funding preferences chosen by funding user 122 for the learning user 102's microlearning fund during the purchase process.

At step 526, when the purchase request is not compatible with the funding item, or, optionally a plurality of funding items of the learning user 102 or, in embodiments, wherein a compatible fund has expired prior to the purchase request, or in embodiments, wherein the purchase request exceeds the one time or time interval transaction limit of a compatible fund, the microlearning purchase management module 238 processes the microlearning purchase transaction from the account balance of the learning user 102. In embodiments, wherein the transaction is a post-paid transaction, the microlearning purchase management module 238, and, optionally, a learner billing module adds the amount to the amount due from the learning user in the next billing cycle.

At step 528, in the embodiments occurring in step 524, the funding interface generator 420 and a generator in the modular learning system 144 generates and displays the updated funding balance and, in some embodiments, the purchase item generated by module 238 to funding user 122 and the learning user 102 on the users' user devices 140. In embodiments occurring in step 526, generator in system 144 generates and displays an updated account balance with, optionally, the corresponding purchase items through an interface to learning user 102 on user 102's user device 140 while the fund balance is not updated by the corresponding interface generators of the learning user 102 and funding user 122 on the modular learning system 144.

Although the method for managing funding transactions in a modular learning system environment is described as being composed of various steps, fewer or more steps (e.g., Display Learning User's Funding Request to Funding User, Receive Predetermined Learning User Preferences from Funding User) may comprise the method, with the present invention still falling within the scope of various embodiments.

Computing Machine Architecture

Figure 6:
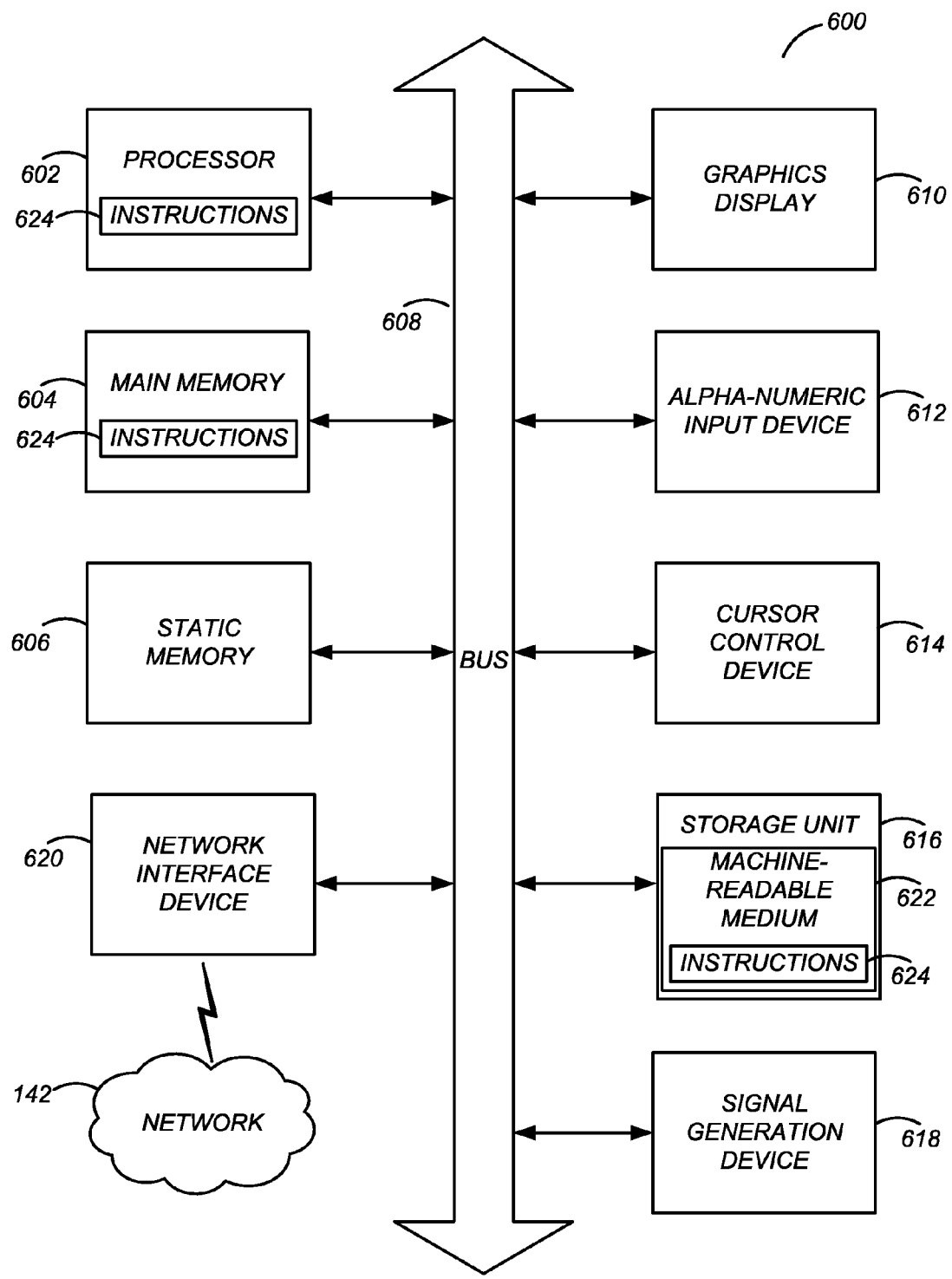
FIG. 6 illustrates modules of an example machine 600 able to read instructions from a machine-readable medium and execute them in a processor (or controller) according to one embodiment.

FIG. 6 is a block diagram illustrating modules of an example machine suitable for use as a modular learning system 144, in which any of the embodiments disclosed herein may be performed, according to one embodiment. This example machine is able to read instructions from a machine-readable medium and execute them in a processor (or controller).

Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 142 via the network interface device 620.

While machine readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

The modular learning system 144 may be one or more servers in which one or more methods disclosed herein are performed. The processor 602 may be a microprocessor, a state machine, an application specific integrated circuit, a field programmable gate array, etc. (e.g., Intel® Pentium® processor). The main memory 604 may be a dynamic random access memory and/or a primary memory of the modular learning system 144. The static memory 606 may be a hard drive, a flash drive, and/or other memory information associated with the modular learning system 144.

The bus 608 may be an interconnection between various circuits and/or structures of the modular learning system 144. The video display 610 may provide graphical representation of information on the modular learning system 144. The alphanumeric input device 612 may be a keypad, keyboard and/or any other input device. The cursor control device 614 may be a pointing device such as a mouse.

The storage unit 616 may be a hard drive, a storage system, and/or other longer term storage subsystem. The signal generation device 618 may be a bios and/or a functional operating system of the modular learning system 144. The network interface device 620 may be a device that may perform interface functions such as code conversion, protocol conversion and/or buffering required for communication to and from a network (e.g., the network 142 of FIG. 1). The machine readable medium 622 may provide instructions 624 on which any of the methods disclosed herein may be performed. The instructions 624 may provide source code and/or data code to the processor 602 to enable any one/or more operations disclosed herein. For example, the modular learning system 144 may be stored in the form of instructions 624 on a storage medium such as the main memory 604 and/or the machine readable medium 622 such as compact disk.

In one embodiment, a non-transitory computer-readable storage medium having a program executable by a computing device (e.g., the modular learning system 144) causes the computing device to perform method steps illustrated in FIG. 5.

Additional Configuration Considerations

Using the funding methods described herein, funding users can direct funds to learners and various learning providers dynamically and at a granular level. The funding system allows funders to seek out and identify particular learners who meet criteria and select learners for funding. In addition, the funding is provided with particularized restrictions such as funding duration and transaction limits to ensure learners use funds in a responsible way and in a way that can encourage long-term learning. In one embodiment, the learning user is required to demonstrate adequate progress before the learning user may receive further funding. In another embodiment, the learning user is provided performance benchmarks demonstrating expected progress of the learning user to maintain funding from the funding user. In another embodiment, the funding user designates funding for the learning user that is available for use by the learning user only after the learning user achieves particular milestones, such as learning application performance at a particular level or the completion of a group or certain number of learning applications. For example, a local trade business council may have a funding role and may seek to increase the number of trained machine operators in order to ensure adequate supply of skilled machinists for employers at a local industrial park. The funding user, here the local trade counsel, can fund applications with appropriate online, facility, and tutor resources. The local business council can establish benchmarks evaluating whether a threshold number of learners is enrolling and adequately meeting threshold performance levels at each milestone. The benchmarks and funding can be automated to remove friction in the funding process and can be structured as so that the learning system provides an impartial basis for determining whether funding should continue.

Thus, the advantages of the funding system allows funding users to provide funding to learning users in the modular learning system without requiring the funding users to identify learning users in advance of providing funding. In addition, the funding users can maintain restrictions on funds such that funds are only used to acceptable learning applications and may be used based on the user's performance.

Throughout this specification, plural instances may implement modules, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate modules in example configurations may be implemented as a combined structure or module. Similarly, structures and functionality presented as a single module may be implemented as separate modules. These and other variations, modifications, additions, and improvements fall within the scope of the subject matter herein.

Certain embodiments are described herein as including functionality implemented in computing logic or a number of modules, modules, or mechanisms, for example, as illustrated in FIGS. 2, 4, and 5. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

In another embodiment, the microlearning purchase and performance interface provided by the modular learning system 144 can be accessed over a local area network, intranet or virtual private network accessible to a limited plurality of user devices at a preschool, school, college, university, educational board, professional standards authority, coaching class, a company, HR department, training department or at a training organization through a user device.

In another embodiment, the microlearning purchase and performance interface provided by the modular learning system 144 can be accessed over a wide area network, General Packet Radio Service network, an Enhanced Data for Global Evolution network, a 3G telecommunications network, a 4G LTE telecommunications network or other telecommunications network through a user device.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Although the present embodiments have been described with reference to specific example embodiments, it will be evident that various modifications and changes may be made to these embodiments without departing from the broader spirit and scope of the various embodiments. For example, the various devices, modules, databases, etc. described herein may be enabled and operated using hardware circuitry (e.g., complementary metal-oxide-semiconductor (CMOS) based logic circuitry), firmware, software and/or any combination of hardware, firmware, and/or software (e.g., embodied in a machine readable medium).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine modules that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and modules of the embodiments herein. This is done merely for convenience and to give a general sense of the invention. This description should be read to include one or at least one and the singular also includes the plural unless it is obvious that it is meant otherwise.

According to the embodiments described in FIG. 1 through 5, various methods and electric structures may be embodied using transistors, logic gates, and electrical circuits (e.g., Application Specific Integrated Circuitry and/or in Digital Signal Processor circuitry). For example, the purchase management module 238, performance management module 240 and other modules of FIGS. 1 to 5 may be enabled using a purchase management circuit, a performance management circuit, and other circuits using one or more of the technologies described herein. In addition, it will be appreciated that the various operations, processes, and methods disclosed herein may be embodied in a machine-readable medium and/or a machine accessible medium compatible with a data processing system (e.g., a server) and may be performed in any order. Accordingly, the specification and drawings are to be regarded in an illustrative rather than a restrictive sense.

Upon reading this disclosure, those of skill in the art will appreciate still additional alternative structural and functional designs for a system and a process for managing the purchase and performance of learning applications and associated application services in a microlearning stack through the disclosed principles herein. Thus, while particular embodiments and applications have been illustrated and described, it is to be understood that the disclosed embodiments are not limited to the precise construction and modules disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for managing funding transactions in a learning system, the method comprising:
   receiving a funding request from a user device operated by a funding user;
   providing for display, on the user device via a funding interface generator, a funding preferences interface to the funding user, the funding preferences interface including interface items for language preferences, location preferences, medium preferences and subject preferences for learning services and corresponding input areas for input preferences for the language preferences, location preferences, medium preferences and subject preferences, the input preferences for the language preferences, location preferences, medium preferences and subject preferences obtained from an electronic learning application database, wherein the medium preferences relate to compatibility of a learning application to perform on a type of learning user device;

receiving funding preferences for learning services, the funding preferences including language preferences, location preferences, medium preferences and subject preferences from the user device operated by the funding user;

accessing an electronic learning user database via a learning user recommendation generator, the electronic learning user database including a plurality of learning users, the electronic learning user database being accessible over an Internet-based computer network, each learning user associated with identity information;

selecting the learning user for funding whose identity information is described by funding preferences via the learning user recommendation generator;

receiving fund spending limits for the selected learning user for funding;

receiving a request for purchasing a learning service from a mobile user device operated by the funded learning user, the learning service including a language, a location, a medium, and a subject;

purchasing the learning service after determining the compatibility of the language, location, medium, and subject of the learning service with the selected language, location, medium and subject preferences of the funding preferences via a purchase management processor, accessing a learning application associated with the purchased learning service from an electronic learning application database via a performance management processor;

performing the learning application associated with the purchased learning service for the funded learning user on the mobile user device operated by the funded learning user, the mobile user device being compatible with the medium funding preference, the learning application performed via a performance management processor accessing the electronic learning user database for learner identify items, learning history and learning purchase history, the performance management processor further accessing tutor metadata from an electronic tutor data base, tools meta data from an electronic learning tools database and learning facility metadata from an electronic facilities database for the learning user to perform instructions from the learning application;

processing a transaction for the learning service purchase via a transaction processor, and updating a funding balance of the funding user in corresponding account balance data fields of the funded learning user in the electronic learning user database based on the transaction via the transaction processor.

2. The computer-implemented method of claim 1, wherein the step of selecting the learning user for funding comprises providing a description of a set of learning users whose identity information is described by the funding preferences to the funding user via the user device and receiving a selection of learning user by the funding user.

3. The computer-implemented method of claim 2, wherein the description of the set of learning users is determined based on privacy information associated with the learning user and privacy information anonymizes learning user information and includes performance information of at least one learning application associated with the learning user.

4. The computer-implemented method of claim 1, wherein the funding preferences further describes:
a plurality of learning users; and
a learning application to be funded by the funding user.

5. The computer-implemented method of claim 1, wherein the fund spending limits designate a transaction limit for individual intervals of time.

6. A non-transitory computer-readable storage medium having tangibly embodied thereon a program of instructions executable by a processor for managing funding transactions in a learning system, the instructions comprising:

receiving a funding request from a user device operated by a funding user;

providing for display, on the user device via a funding interface generator, a funding preferences interface to the funding user, the funding preferences interface including interface items for language preferences, location preferences, medium preferences and subject preferences for learning services and corresponding input areas for input preferences for the language preferences, location preferences, medium preferences and subject preferences, the input preferences for the language preferences, location preferences, medium preferences and subject preferences obtained from an electronic learning application database, wherein the medium preferences relate to compatibility of a learning application to perform on a type of learning user device;

receiving funding preferences from the user device, the funding preferences for learning services, the funding preferences including language preferences, location preferences, medium preferences and subject preferences from the user device operated by the funding user;

accessing an electronic learning user database via a learning user recommendation generator, the electronic learning user database including a plurality of learning users, the electronic learning user database being accessible over an Internet-based computer network, each learning user associated with identity information;

selecting the learning user for funding whose identity information is described by the funding preferences via the learning user recommendation generator;

receiving fund spending limits for the selected learning user for funding;

receiving a request for purchasing a learning service from a mobile user device operated by the funded learning user, the learning service including a language, a location, a medium and a subject;

purchasing the learning service after determining the compatibility of the language, location, medium and subject of the learning service with the selected language, location, medium and subject preferences of the funding preferences via a purchase management processor, accessing a learning application associated with the purchased learning service from an electronic learning application database via a performance management processor;

performing the learning application associated with the purchased learning service for the funded learning user on the mobile user device operated by the funded learning user, the mobile user device being compatible with the medium funding preference, the learning application performed via a performance management processor accessing the electronic learning user database for learner identify items, learning history and learning purchase history, the performance management processor further accessing tutor metadata from an electronic tutor data base, tools metadata from an electronic learning tools database and learning facility metadata from an electronic facilities database for the learning user to perform instructions from the learning application;

processing a transaction for the learning service purchase via a transaction processor; and updating a funding balance of the funding user in corresponding account balance data fields of the funded learning user in the electronic learning user database based on the transaction via the transaction processor.

7. The computer-readable storage medium of claim 6, wherein the step of selecting the learning user for funding comprises providing a description of a set of the learning user whose identity information is described by the funding preferences to the funding user via the user device and receiving a selection of the learning user by the funding user.

8. The computer-readable storage medium of claim 7, wherein description of set of learning users is determined based on privacy information associated with the learning user and privacy information anonymizes learning user information and includes performance information of at least one learning application associated with the learning user.

9. The computer-readable storage medium of claim 6, wherein the funding preferences further describe
a plurality of learning users; and
a learning application to be funded by the funding user.

10. The computer-readable storage medium of claim 6, wherein the fund spending limits designate a transaction limit for individual intervals of time.

11. An apparatus comprising:
a network interface;
a processor coupled to the network interface;
a memory coupled to the processor, wherein the memory includes instructions for execution on the processor, the instructions causing the processor to execute:
receiving a funding request from a user device operated by a funding user;
providing for display, on the user device via a funding interface generator, a funding preferences interface to the funding user, the funding preferences interface including interface items for language preferences, location preferences, medium preferences and subject preferences for learning services and corresponding input areas for input preferences for the language preferences, location preferences, medium preferences and subject preferences, the input preferences for the language preferences, location preferences, medium preferences and subject preferences obtained from an electronic learning application database, wherein the medium preferences relate to compatibility of a learning application to perform on a type of learning user device;
receiving funding preferences for learning services, the funding preferences including language preferences, location preferences, medium preferences and subject preferences from the user device operated by the funding user;

accessing an electronic learning user database via a learning user recommendation generator, the electronic learning user database including a plurality of learning users, the electronic learning user database being accessible over an Internet-based computer network, each learning user associated with identity information;

selecting the learning user for funding whose identity information is described by funding preferences via the learning user recommendation generator;

receiving fund spending limits for a selected learning user for funding;

receiving a request for purchasing a learning service from a mobile user device operated by the funded learning user, the learning service including a language, a location, a medium, and a subject; and purchasing the learning service after determining the compatibility of the language, location, medium, and subject of the learning service with the selected language, location and subject preferences of the funding preferences via a purchase management processor, accessing a learning application associated with the purchased learning service from an electronic learning application database via a performance management processor;

performing the learning application associated with the purchased learning service for the funded learning user on the mobile user device operated by the funded learning user, the mobile user device being compatible with the medium funding preference, the learning application performed via a performance management processor accessing the electronic learning user database for learner identify items, learning history and learning purchase history, the performance management processor further accessing tutor metadata from an electronic tutor data base, tools metadata from an electronic learning tools database and learning facility metadata from an electronic facilities database for the learning user to perform instructions from the learning application;

processing a transaction for the learning service purchase via a transaction processor, and updating a funding balance of the funding user in corresponding account balance data fields of the funded learning user in the electronic learning user database based on the transaction via the transaction processor.

12. The apparatus of claim 11, wherein the step of selecting the learning user for funding comprises providing a description of a set of learning users whose identity information is described by the funding preferences to the funding user via the user device and receiving a selection of the learning user by the funding user.

13. The apparatus of claim 12, wherein description of set of learning user is determined based on privacy information associated with the learning user and privacy information anonymizes learning user information and includes performance information of at least one learning application associated with the learning user.

14. The apparatus of claim 12, wherein the funding preferences further describes
a plurality of learning users; and
a learning application to be funded by the funding user.

15. The apparatus of claim 11, wherein the fund spending limits designate a transaction limit for individual intervals of time.

* * * * *